(12) United States Patent
Richter et al.

(10) Patent No.: US 8,690,352 B2
(45) Date of Patent: Apr. 8, 2014

(54) METHOD AND DEVICE FOR PROJECTING AT LEAST ONE LIGHT BEAM

(75) Inventors: Jens Richter, Lappersdorf (DE); Jan Oliver Drumm, Regensburg (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 561 days.

(21) Appl. No.: 12/812,059

(22) PCT Filed: Jan. 8, 2008

(86) PCT No.: PCT/EP2008/000073
§ 371 (c)(1),
(2), (4) Date: Jul. 8, 2010

(87) PCT Pub. No.: WO2009/086847
PCT Pub. Date: Jul. 16, 2009

(65) Prior Publication Data
US 2010/0283413 A1    Nov. 11, 2010

(51) Int. Cl.
*G03B 21/20* (2006.01)
*H01S 3/13* (2006.01)

(52) U.S. Cl.
USPC .......................... 353/85; 372/29.15

(58) Field of Classification Search
USPC .............. 353/85, 121, 122; 372/38.03, 38.02,
372/38.07, 38.1, 29.01, 29.012, 29.014,
372/29.015; 347/237, 247, 239, 253, 255
See application file for complete search history.

(56) References Cited

U.S. PATENT DOCUMENTS

| 6,671,299 B2* | 12/2003 | Suda ........................... 372/38.01 |
| 6,822,625 B2 | 11/2004 | Tomizawa et al. |
| 7,847,997 B2 | 12/2010 | Sandner et al. |
| 2003/0011751 A1 | 1/2003 | Sakata et al. |
| 2005/0269492 A1 | 12/2005 | Yun et al. |
| 2006/0023164 A1* | 2/2006 | Sakaguchi et al. .............. 353/20 |
| 2006/0029295 A1 | 2/2006 | Wine et al. |
| 2006/0170883 A1* | 8/2006 | Matsui ........................... 353/85 |
| 2006/0285078 A1 | 12/2006 | Kasazumi et al. |
| 2007/0019407 A1 | 1/2007 | Song |
| 2007/0035504 A1 | 2/2007 | Yamada |
| 2007/0035723 A1 | 2/2007 | Takeda et al. |
| 2007/0206259 A1 | 9/2007 | Nakajima |
| 2009/0316243 A1 | 12/2009 | Tsuida |

FOREIGN PATENT DOCUMENTS

| DE | 102004027674 A1 | 1/2006 |
| DE | 102007011425 A1 | 9/2008 |
| JP | 63148275 A | 6/1988 |
| JP | 02018065 A | 1/1990 |
| JP | 08286132 A | 11/1996 |
| JP | 2002135801 A | 5/2002 |
| JP | 2005308865 A | 11/2005 |

(Continued)

OTHER PUBLICATIONS

International Search Report of PCT/EP2008/000073 dated Jul. 3, 2008.

(Continued)

*Primary Examiner* — William C Dowling
*Assistant Examiner* — Ryan Howard

(57) ABSTRACT

A method for projecting at least one light beam may include lengthening at least in part a holding duration for at least one pixel with respect to at least one further pixel.

21 Claims, 22 Drawing Sheets

(56) References Cited

FOREIGN PATENT DOCUMENTS

| JP | 2007086242 A | 4/2007 |
| JP | 2007140010 A | 6/2007 |
| JP | 2010008529 A | 1/2010 |
| KR | 100607644 B1 | 7/2006 |
| WO | 2005038505 A1 | 4/2005 |
| WO | 2005121866 A1 | 12/2005 |
| WO | 2008032485 A1 | 3/2008 |

OTHER PUBLICATIONS

English translation of the International Preliminary Report on Patentability of PCT/EP2008/000073.
English abstract of JP 63148275 A.
English abstract of JP 2007140010 A.
English abstract of JP 02018065 A.
English abstract of JP 08286132 A.
English abstract of JP 2010008529 A.
English abstract of JP 2007086242 A.
English abstract of JP 08-015631.
English abstract of JP 2002-178559.
English abstract of JP 09-163097.
English abstract of JP 09-169135.
English abstract of JP 08-286132.
English abstract of JP 2007-047638.
English abstract of JP 2007-047355.
English abstract of JP 2005-037557.
English abstract of 2003-185953.

* cited by examiner

| | WITH compensation | WITHOUT compensation |
|---|---|---|
| Contrast | $K = \dfrac{\left(1 - {t_{rf}}/{T_p}\right)}{2\dfrac{A_{Offset}}{A_{max}} + \left(1 - {t_{rf}}/{T_p}\right)}$ | $K = \dfrac{\left(1 - {t_{rf}}/{T_p}\right)}{2\dfrac{A_{Offset}}{A_{max}} + 1}$ |
| Contrast ratio | $K_V = \dfrac{\left(1 - {t_{rf}}/{T_p}\right) + \dfrac{A_{Offset}}{A_{max}}}{\dfrac{A_{Offset}}{A_{max}}}$ | $K_V = \dfrac{\left(1 - {t_{rf}}/{2T_p}\right) + \dfrac{A_{Offset}}{A_{max}}}{\left({t_{rf}}/{2T_p}\right) + \dfrac{A_{Offset}}{A_{max}}}$ |
| Maximum intensity | $I_{max} = \left(\left(1 - {t_{rf}}/{T_p}\right) \cdot A_{max} + A_{Offset}\right) \cdot T_r$ | $I_{max} = \left(\left(1 - {t_{rf}}/{2 \cdot T_p}\right) \cdot A_{max} + A_{Offset}\right) \cdot T_r$ |
| Minimum intensity | $I_{min} = A_{Offset} \cdot T_r$ | $I_{min} = \left(\left({t_{rf}}/{2 \cdot T_p}\right) \cdot A_{max} + A_{Offset}\right) \cdot T_r$ |
| $A_{max}$ | Maximum intensity; | |
| $A_{Offset}$ | Offset intensity (e.g. as a result of ambient light); | |
| $t_{rf}$ | A time required to reach 100% from 0% of the maximum intensity; | |
| $T_p$ | A duration for a pixel during the transformation between time domain and space domain. | |

Fig.16

METHOD AND DEVICE FOR PROJECTING AT LEAST ONE LIGHT BEAM

RELATED APPLICATIONS

The present application is a national stage entry according to 35 U.S.C. §371 of PCT application No.: PCT/EP2008/000073 filed on Jan. 8, 2008.

TECHNICAL FIELD

Various embodiments relate to a method and a device for projecting at least one light beam.

BACKGROUND

In projectors based on a so-called "flying spot" functional principle, by means of a two-dimensional resonant micromirror light beams (typically consisting of the three primary colors, red, green and blue), are deflected and projected onto an image plane.

FIG. 1 shows a schematic diagram for illustrating the functional principle of "flying spot" projection. In this case, light beams of different colors from laser sources 101 (red R), 102 (blue B) and 103 (green G) are respectively directed onto a semitransparent mirror (the transmission and the reflection of the mirrors are effected in a manner dependent on the wavelength), 104, 105, 106 and are then directed as a common beam 110 (also referred to as projection beam) onto a two-dimensional resonant micromirror 107, which deflects the common beam 110 two-dimensionally and projects it onto an image plane 108. In this case, in the image plane 108, the image is built up by the continuously harmonically deflected common beam 110 (see beam profile 109 in the image plane 108).

An image information item is generated and represented by means of an intensity modulation of the respective light source 101, 103 synchronously with the deflection of the micromirror 107.

On account of the nonlinear deflection of the micromirror 107 and the resultant nonlinear beam profile 109 in the image plane 108, a time division multiplex method is used for representing individual, locally discrete image information items ("pixels"): consequently, in defined time segments, specific information items are projected onto the image plane.

Projected information means, in particular, a superimposition of the brightnesses and colors of the light beams generated by the light sources 101 to 103, it being possible for the brightness of a light beam to be set on the basis of an amplitude of the associated light source.

Preferably, the light sources are in each case a laser, in particular a laser diode. Consequently, the current through the laser corresponds to the brightness of the light emitted by said laser.

FIG. 2 shows an illustration of scan time ranges per pixel in seconds as a function of a position of the respective pixel, to be precise both for a column (see curve 201) and for a line (see curve 202).

By way of example, a projected image has a width of 640 pixels and a height of 480 pixels. The deflection 109 of the common beam 110 as described and shown in FIG. 1 has the effect that, in the case where the image is built up line-by-line, for example, the common beam 110 is significantly faster in the center of the line than in an edge region.

By way of example, the micromirror in the example in accordance with FIG. 2 has a horizontal frequency of 27 kHz and a vertical frequency of 1.2 kHz with a resolution of 640 times 480 pixels.

A time range, a temporally governed length and also a duration for each pixel thus result from a spatial assignment of the pixels in an XY coordinate system over time by means of a time division multiplex method.

FIG. 3 shows an excerpt from FIG. 2 for the time ranges along a (horizontal) line in the region of the center of the image plane (image center).

On the basis of the parameters mentioned above it becomes clear that the required temporal resolution of the electronics for a modulation of the intensity or amplitude of the light beams for the locally error-free representation of the image information on the projection area lies in a range which is smaller than one picosecond. An assignment error could theoretically be reduced with complex circuits having a correspondingly high temporal resolution. However, such complexity requires expensive components and is not always feasible in practice, e.g. depending on the resolution chosen.

If the temporal resolution is reduced, however, the image quality is reduced and distortion occurs at the pixel level on account of the absent spatial assignments.

A further problem consists in the transformation between time domain and space domain on account of the nonlinear deflection of the micromirror.

In a time segment in which a pixel is selected by the time division multiplex method, rise and fall times of the electronics influence the contrast between the pixels. This influence is intensified by the duration of a rise and/or fall of a signal edge: the longer the edge in relation to the time period available for the pixel, the poorer the contrast between the pixels.

In accordance with the above explanations concerning FIG. 2 and FIG. 3, given constant edge steepness, the contrast is the poorest when time is available the least overall for the pixels, that is to say in the image center.

FIG. 4 shows by way of example an excerpt from an image to be projected in an image plane with the greatest possible contrast, that is to say a transition from white to black or vice versa between two respective pixels.

FIG. 5 shows in a correspondingly simplified manner a drive voltage 501 for a laser and a resultant current 502 through the laser.

The current profile 502 through the laser is typically proportional to an emitted quantity of light and thus corresponds to the brightness perceived by an observer.

FIG. 5 illustrates the pixels n−2, n−1 and n, which have a time duration $T_p$, for example, and which have a bright-dark-bright pattern in accordance with FIG. 4. The drive voltage 501 turns the laser on, off and on again.

On account of the finite edge steepness, the switch-on delays 503 and 505 arise in the course of the laser being switched on and switch-off delays 504 and 506 arise in the course of the laser being switched off.

These delays significantly vitiate the contrast between the pixels. In particular, the dark pixels are partly illuminated during the delays 504 and 506, as a result of which a maximum attainable contrast of the projection unit during the representation of edges in the image (high spatial frequency) decreases significantly.

FIG. 6 shows a block diagram for the driving of a laser 603.

A digital signal 605 having a width of n-bits is converted into an analog signal by a digital/analog converter 601 (DAC) and amplified by means of a driver for the driving of the laser 603. The laser 603 is connected by its anode to a supply voltage 604 (VDD) and is driven via the digital/analog converter 601 by means of a driver 602.

An image source, e.g. a personal computer or a personal digital assistant (PDA) supply digital signals 605 having a width of n-bits, which are correspondingly converted by the digital/analog converter 601 into an analog signal (current signal or voltage signal) for the driving of the laser 603.

The high temporal resolution required is attained by means of a high conversion rate (sampling rate). This imposes extreme demands on the conversion rate of the digital/analog converter 601.

If, by way of example, the above-described system having a resolution of 640 times 480 pixels, a horizontal frequency of 27 kHz and a vertical frequency of 1.18 kHz is considered, then the digital/analog converter 601 has to provide a temporal resolution of less than 280 ps in order that the local resolution error lies below 1%.

This means a bandwidth demand of 3 GHz imposed both on the digital interfaces and on the conversion rate of the digital/analog converter 601.

Such electronics, if they can be realized at all, are therefore extremely complex, lossy and expensive. Furthermore, it should be taken into account that the circuit illustrated in FIG. 6 and the resultant complexity become necessary separately for each laser and the costs associated therewith multiply.

SUMMARY

Various embodiments avoid the disadvantages mentioned above the case of the "flying spot" a roach providing a simple, efficient and error-tolerant and cost-effective possibility of projection.

Various embodiments provide a method for projecting at least one light beam is specified, wherein at least in part a holding duration for at least one pixel is lengthened with respect to at least one further pixel.

Particularly in the flying spot method, a projection beam is moved harmonically over the image plane. As explained above, the speed of the projection beam varies depending on the position of the pixel to be represented. In this respect, a pixel in the center of a line of the projection area has a shorter time duration (that is to say that the projection beam has a correspondingly higher speed here) than a pixel at the edge of the projection area.

This effect is efficiently compensated for by virtue of the fact that, in particular, a holding duration is introduced for all those points which have a longer time duration than the pixel at which the projection beam has the greatest speed.

The approach presented here can be used for the projection beam comprising a plurality of light beams or else for each individual light beam separately.

The expression of the holding duration encompasses, in particular, a value (e.g. a modulation current for at least one laser of the at least one light beam) or an information item for the pixel.

Basic clock with which the digital components of a circuit are operated.

One configuration consists in the fact that at least in part the holding duration for the at least one pixel is lengthened depending on a location of the projection of the respective pixel.

The holding duration can advantageously be lengthened by means of at least one sample-and-hold stage.

In particular, the holding duration is set asynchronously with respect to the basic clock. It is thus not necessary for the basic clock to be an integral multiple of every possible holding duration. The basic clock or the maximum required operating frequency of the digital components can thus advantageously be reduced.

In one development, at least one digital/analog converter is used for driving the at least one light beam, wherein the digital/analog converter is operated with a basic clock, wherein at least in part the holding duration for the at least one pixel is lengthened by a pixel clock being determined on the basis of the basic clock, the holding duration for the at least one pixel being lengthened on the basis of the pixel clock.

In one development, in particular, the pixel clock corresponds to an integral multiple of the basic clock.

The holding duration can advantageously be asynchronous with respect to the basic clock and also with respect to the pixel clock.

In another development, the holding duration can be set by means of a delay stage. In particular, the delay stage can be driven by means of a (digital) drive signal.

In this case, a digital signal having a predefined width, e.g. 4 bits or 5 bits, can preferably be used, depending on a required quantization of the delay.

In one configuration, moreover, the delay stage includes a sample-and-hold stage and a time controller, the time controller controlling the sample-and-hold stage on the basis of the drive signal.

The digital drive signal can thus be used to generate a pulse whose length is correlated with the drive signal and thus predefines the holding duration for the sample-and-hold stage.

It is also possible for the drive signals to be predefined in analog fashion and for the sample-and-hold stage to be driven on the basis of these analog drive signals.

Preferably, the digital or analog drive signals correspond to the holding duration that is necessary depending on the respective projection in order to attain or fall below a predefined minimum requirement (resolution error).

In another configuration, a first information item of the pixel is altered in a manner dependent on a second information item. In particular, the first information item of the pixel can be altered during the time duration for the projection of the pixel.

As a result of this, the problem of the finite edge steepness and the resultant decrease in contrast can be effectively compensated for. Thus, the first information item of the pixel can be adapted to the second information item of the pixel before the time duration of the first pixel has actually elapsed. For this purpose, advantageously, two pixels are buffer-stored and their information items are compared with one another or adapted in the manner described.

As an alternative, it is also possible for only the previous value to be buffer-stored.

In one development, the first information item includes an amplitude and/or a brightness for the representation of the pixel. The second information item can correspondingly include an amplitude and/or a brightness of at least one subsequent pixel.

In particular, the brightness of a pixel can be dependent on the level of the modulation current of a laser.

In another development, the first information item of the pixel is altered in such a way that the second information item is attained substantially upon the at least one subsequent pixel being attained.

In particular, attaining the at least one subsequent pixel can include one of the following criteria:

upon, shortly before or shortly after attaining the at least one subsequent pixel;

substantially upon, shortly before or shortly after attaining the spatial extent predefined for the pixel.

In one development, moreover, a storage unit for at least one pixel is provided, for the comparison of the first information item of the pixel with the second information item.

In particular, the storage unit can include two sample-and-hold stages that are driven alternately.

In one configuration, at least two digital/analog converters are provided which alternately guide the light beam, for the comparison of the first information item of the pixel with the second information item.

In this case, the digital/analog converters perform the functionality of the storage unit by the output signals of the digital/analog converters alternately being compared.

As an alternative, one digital/analog converter having a sampling rate that is higher by the factor of two could also be provided. Storage can then be effected by means of sample-and-hold stages.

Another configuration consists in the fact that the first information item of the pixel is altered in a manner dependent on a second information item by a fall time required for the falling edge being subtracted from a duration of the pixel substantially at the end of the pixel.

In one configuration, furthermore, the at least one light beam is parameterized in such a way that an imaging aberration is compensated for.

By way of example, static mounting inaccuracies of the light sources or of the lasers or of the optical components can be compensated for in this way. Such inaccuracies give rise to a possible offset between the light beams of a plurality of light sources (e.g. three different-colored lasers), for example, on the image plane (projection plane). Consequently, the light sources illuminate different points of the projection area at a predefined point in time. Such an error constantly increases as the illumination time duration decreases, and thus with higher resolution.

The approach presented here makes it possible to compensate for such mounting errors in the resulting sub-pixel region (that is to say in a region smaller than a pixel) without complex and cost-intensive mounting technology.

In this respect, in one development, the holding duration for each at least one light beam is set in such a way that each at least one light beam is projected into a region corresponding to the respectively associated pixel.

In another development, the at least one light beam is deflected locally by means of a deflecting projection unit. Preferably, the deflecting projection unit includes a micromirror, in particular a two-dimensional resonant micromirror.

In another development, the at least one light beam is made from at least one light source.

In one development, in particular, the at least one light source includes at least one laser, in particular at least one laser diode.

In one development, moreover, the light beam is made from a red laser, a blue laser and a green laser.

In one development, furthermore, the light beam is made from a red laser, a blue laser, and two green lasers.

The light beam can correspondingly be made from multiples of the above combinations.

In the context of an additional development, the at least one light beam is projected by means of a flying spot method.

Furthermore, in order to achieve the object described above, a device for projecting at least one light beam including a processor unit and/or a hardwired circuit arrangement and/or a freely programmable logic is specified, which is set up in such a way that the method as described here can be carried out.

Said processor unit can be or include any type of processor or computer with correspondingly required peripherals (storage units, input/output interfaces, input/output devices etc.). The hardwired circuit unit or freely programmable logic can be an FPGA, CPLD, ASIC or any other integrated circuit.

Moreover, in order to achieve the above object, a device for projecting at least one light beam is specified including a delay stage, on the basis of which at least in part a holding duration for at least one pixel can be lengthened with respect to at least one further pixel.

The developments, configurations and other embodiments with regard to the various methods are correspondingly analogously likewise applicable to the devices.

In one development, at least in part the holding duration for the at least one pixel can be lengthened on the basis of the delay stage depending on a location of the projection of the respective pixel.

A next development consists in the fact that a digital/analog converter for driving the at least one light beam is provided,
wherein the digital/analog converter can be operated with a basic clock,
wherein at least in part the holding duration for the at least one pixel can be lengthened by a pixel clock being determinable on the basis of the basic clock, the holding duration for the at least one pixel being able to be lengthened on the basis of the pixel clock.

In one configuration, the pixel clock corresponds to an integral multiple of the basic clock.

An alternative embodiment consists in the fact that the delay stage can be driven by means of a drive signal, in particular a digital drive signal.

In a next configuration, the delay stage includes a sample-and-hold stage and a time controller, the time controller controlling the sample-and-hold stage on the basis of the drive signal.

In one configuration, moreover, the device has a contrast enhancement unit, wherein a first information item of the pixel can be altered in a manner dependent on a second information item.

One development consists in the fact that the first information item of the pixel can be altered during the time duration for the projection of the pixel.

In an additional configuration, the first information item includes an amplitude and/or a brightness for the representation of the pixel. The second information item can correspondingly include an amplitude and/or a brightness of at least one subsequent pixel.

In another configuration, the first information item of the pixel can be altered in such a way that the second information item is attained substantially upon the at least one subsequent pixel being attained.

In one possibility, moreover, attaining the at least one subsequent pixel includes one of the following criteria:
upon, shortly before or shortly after attaining the at least one subsequent pixel;
substantially upon, shortly before or shortly after attaining the spatial extent predefined for the pixel.

In a further configuration, moreover, a storage unit for at least one pixel is provided, for the comparison of the first information item of the pixel with the second information item.

In another development, the storage unit includes two sample-and-hold stages that are driven alternately.

In one development, moreover, at least two digital/analog converters are provided which alternately guide the light beam, for the comparison of the first information item of the pixel with the second information item.

One development consists in the fact that the first information item of the pixel can be altered in a manner dependent on a second information item by a fall time required for the falling edge being subtracted from a duration of the pixel substantially at the end of the pixel.

In a further configuration, the at least one light beam can be parameterized in such a way that an imaging aberration is compensated for.

In one configuration, moreover, the holding duration for each at least one light beam is set on the basis of the delay stage in such a way that each at least one light beam is projected into a region corresponding to the respectively associated pixel.

In one configuration, furthermore, a deflecting projection unit is provided, which locally deflects the at least one light beam. In particular, the deflecting projection unit can include a micromirror, in particular a two-dimensional resonant micromirror.

In the context of an additional development, the at least one light beam can be made from at least one light source. Preferably, the at least one light source can include at least one laser, in particular at least one laser diode.

In one development, the light beam is made from a red laser, a blue laser and a green laser.

In another development, the light beam is made from a red laser, a blue laser, and two green lasers.

In one development, moreover, the device projects the at least one light beam by means of a flying spot method.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 16 shows a table that compares variables such as contrast, contrast ratio, maximum intensity and minimum intensity for the cases with and without compensation;

DETAILED DESCRIPTION

The following detailed description refers to the accompanying drawings that show, by way of illustration, specific details and embodiments in which the invention may be practiced.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

This is achieved, in particular, by virtue of the fact that an output signal of the digital/analog converter is held for a predefined time duration, such that a hold duration corresponds to the correct representation of the pixel depending on the respective geometry or position of the pixel within the projected image.

Furthermore, the approach presented herein permits a solution to the problem of the finite edge steepness in such a way that an information item (e.g. an amplitude or a brightness) per pixel is altered in a manner dependent on an information item (e.g. an amplitude or a brightness) of at least one subsequent pixel, in particular by a fall time that is necessary for the falling edge being subtracted from the nominal time for a pixel at the end of the pixel.

This effectively prevents the unambiguous spatial assignment of the pixels on the projection area from being lost on account of the finite edge steepness.

A further advantageous approach consists in the combination of the solutions. Both the solution for reducing the spatial assignment error and the optimization of the contrast by compensation of the finite edge steepness influence the time per pixel.

It is furthermore proposed to compensate for a mounting inaccuracy in a vertical sub-pixel region by manipulation of the time per pixel.

Improvement of the Spatial Assignment

Figure 7:
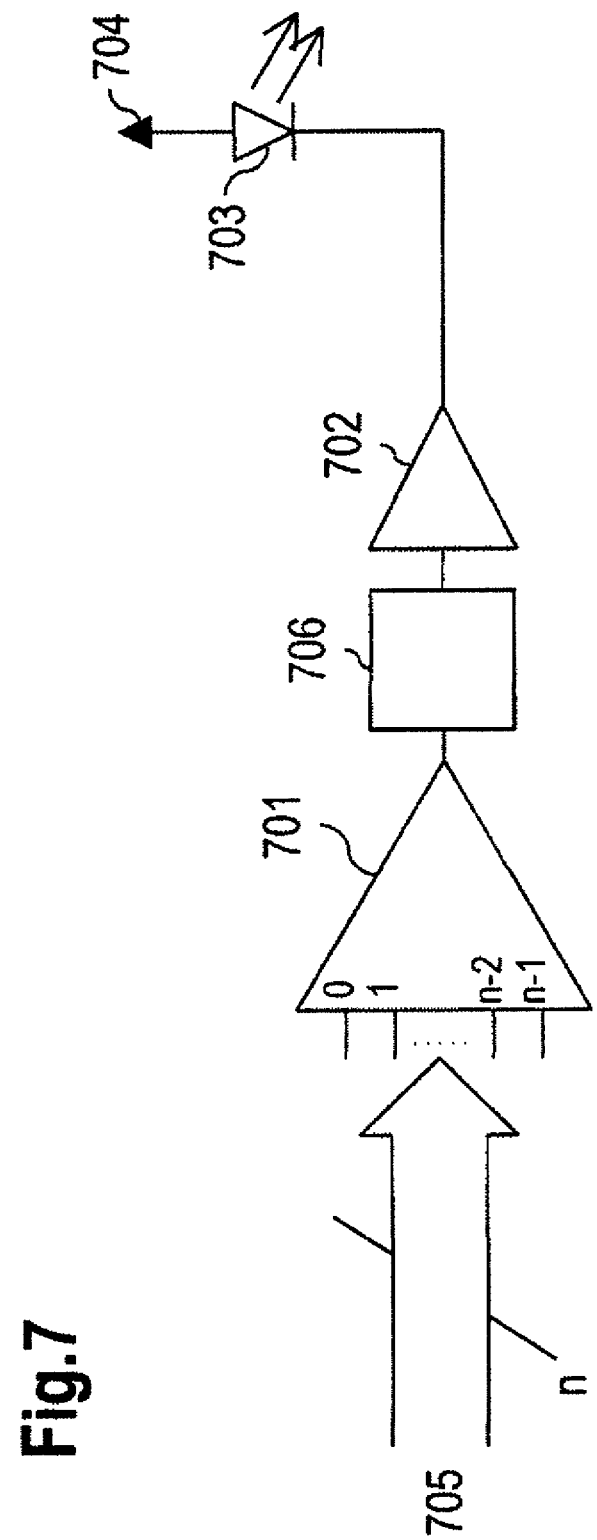
FIG. 7 shows a block diagram for the driving of a laser by means of a delay stage.

FIG. 7 shows a block diagram for the driving of a laser 703 by means of a delay stage 706.

A digital signal 705 having a width of n-bits is converted into an analog signal by a digital/analog converter 701 (DAC), temporally delayed by means of the adjustable delay stage 706 and amplified with the aid of a driver for the driving of the laser 703. The laser 703 is connected by its anode to a supply voltage 704 (VDD).

This results in an intended asynchronism between a basic clock for operating the digital/analog converter 701 and a pixel clock with which the respective pixels are represented.

If a system having a resolution of 640 times 480 pixels is assumed, for example, wherein a micromirror for deflecting the projection beam has a horizontal frequency of 27 kHz and a vertical frequency of 1.18 kHz, then the digital/analog converter 701 requires a temporal resolution of less than 280 ps in order that the local resolution error (or assignment error) lies below 1%.

The resolution error corresponds to an erroneous spatial extent of a pixel on the projection plane.

Figure 8:
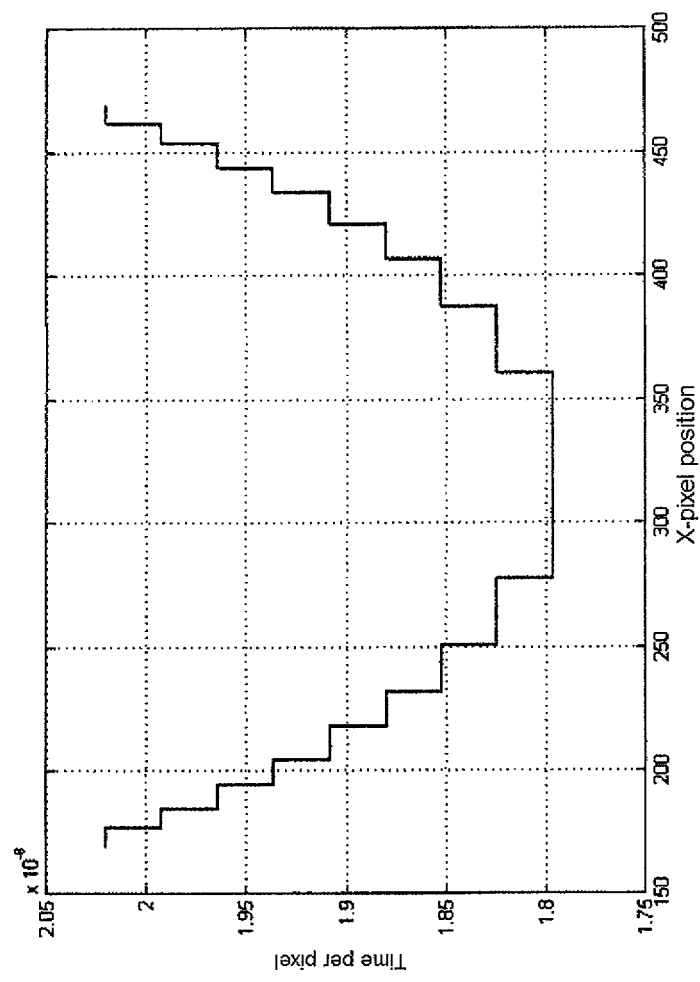
FIG. 8 shows an illustration of quantized time ranges per pixel in a region around the image center.

This results in a temporal quantization per pixel in the image center in accordance with FIG. 8.

Figure 9:
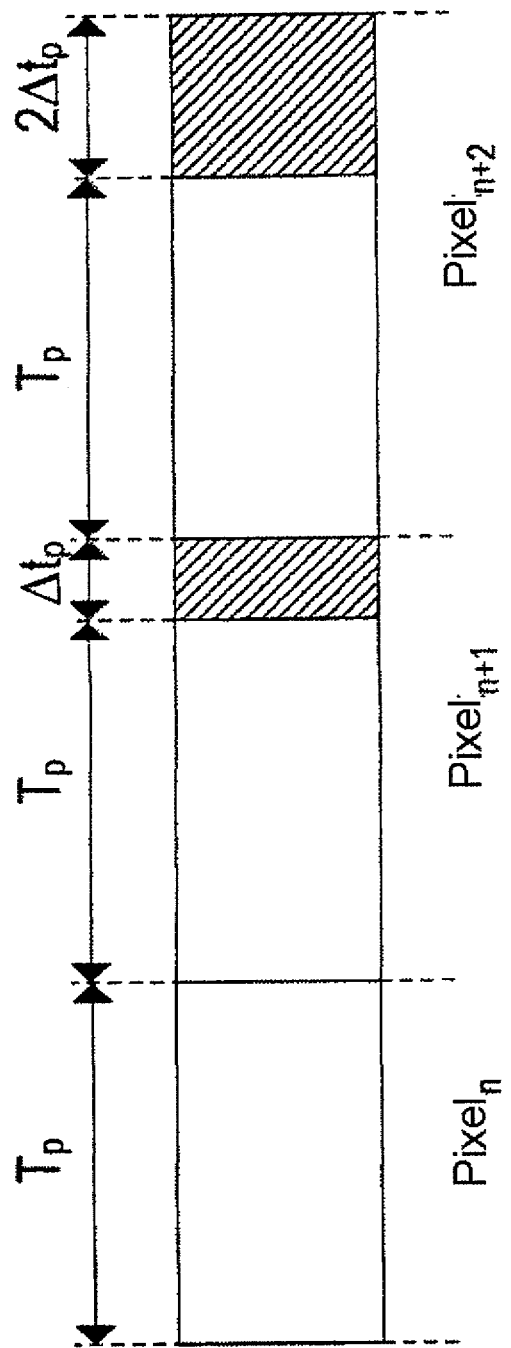
FIG. 9 shows an assignment of the time ranges to specific pixels.

FIG. 9 illustrates an assignment of the time ranges to specific pixels.

For a central pixel n (e.g. a pixel having the coordinates (width, height) 320, 240) of a projection line, the time range required for this pixel n corresponds to the basic clock. This results from the fact that for the pixel n the shortest occurring time range of all the projected pixels requires because the projection beam sweeps over this pixel n at the highest speed.

Consequently, the time range $T_p$ for the pixel n determines the duration of the basic clock with which the digital/analog converter is to be operated.

In the example, given a mirror frequency of vertically 1.18 kHz and horizontally 27 kHz and also a resolution of 640×480, a basic clock of 56 MHz results since the described time range for the pixel n is 18 ns.

In order to attain a predefined accuracy in the assignment of time and position of each individual pixel, in accordance with FIG. 9 a time range for a pixel n+1 is greater than the time range for the pixel n by an additional time range $\Delta t_p$.

In accordance with the present example, the additional time range $\Delta t_p$ is set to 280 ps in order to enable an assignment error of less than 1%.

Furthermore, a time range for a pixel n+2 is greater than the time range for the pixel n+1 by an additional time range $2\Delta t_p$. The additional time range required for the pixels from the image center to the edge thus becomes larger per pixel. Starting from a specific pixel m, the additional time range is $$m \cdot \Delta t_p = \Delta T_p$$

That means that the pixel clock can be halved starting from the pixel m since the following holds true:

$$m \cdot \Delta t_p + \Delta T_p = 2 \cdot \Delta T_p$$

The time base (reference clock) of the entire system is advantageously chosen such that said reference clock is an integral divisor of the time range of the temporally shortest pixel (pixel clock).

By way of example, a 4-bit interface with a basic clock of 112 MHz can serve for the driving of the delay stage.

Figure 6:
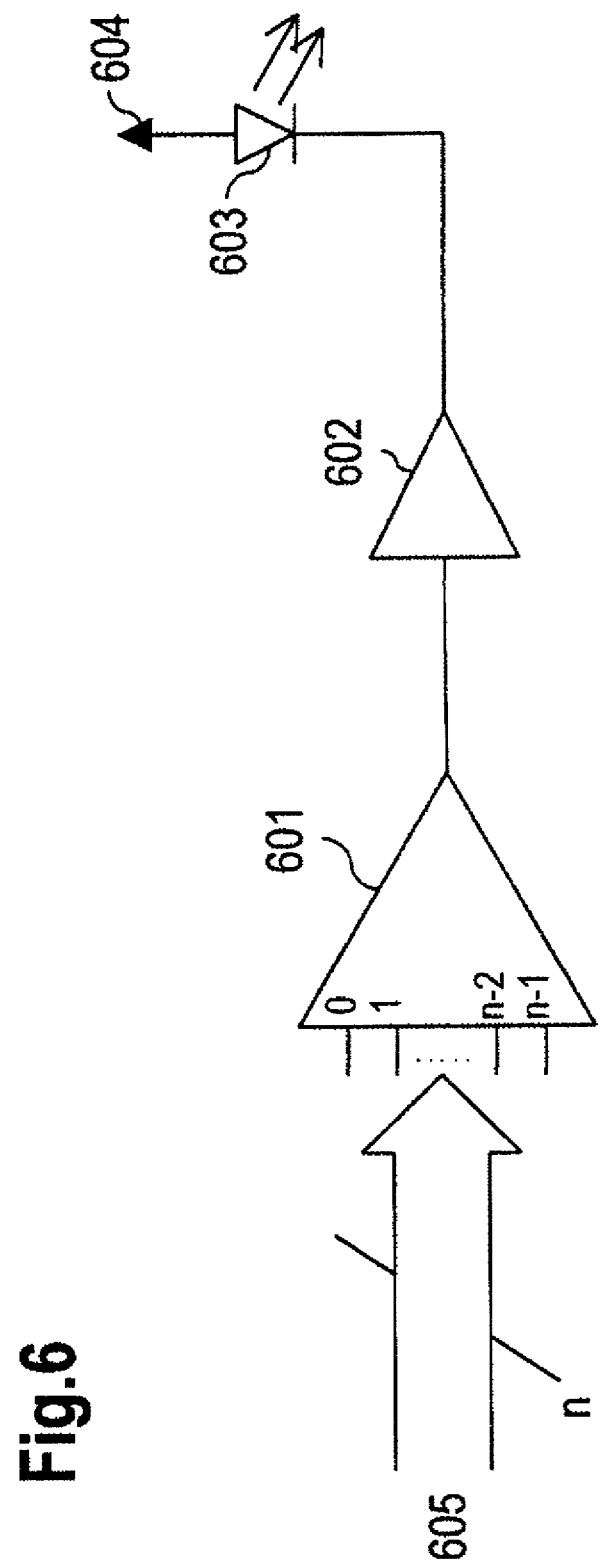
FIG. 6 shows a block diagram for driving a laser.

The model shown in FIG. 6 can be employed for the two-dimensional micromirror and likewise for other approaches of mirror systems.

Figure 10:
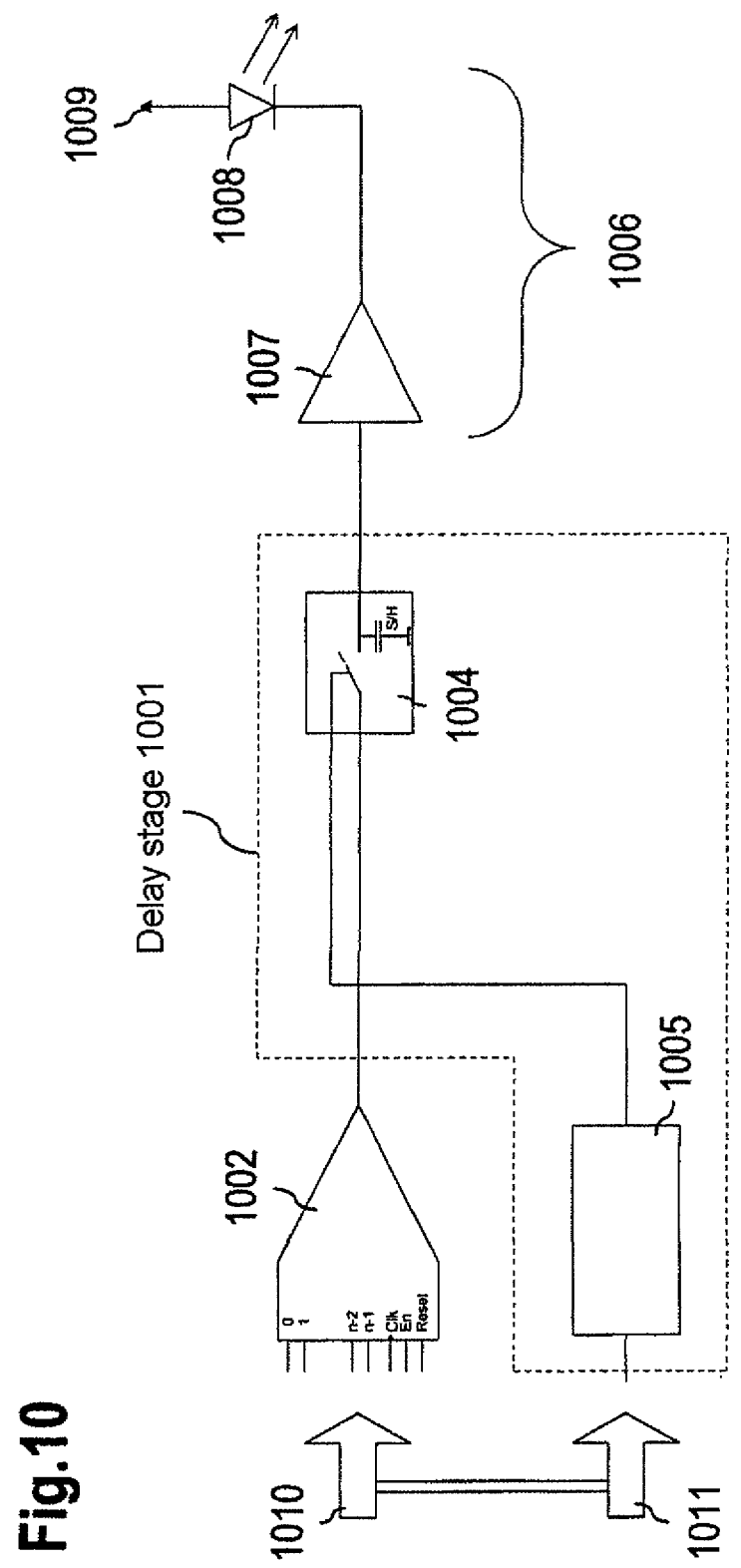
FIG. 10 shows a block diagram for the driving of a laser by means of a (programmable) delay stage including a time controller and also a switch with a sample-and-hold stage.

FIG. 10 shows a block diagram for the driving of a laser 1008 by means of a (programmable) delay stage 1001 including a time controller 1005 and also a switch 1004.

A digital signal 1010 having a width of n-bits is converted into an analog signal by a digital/analog converter 1002 (DAC) and applied to the switch 1004. A digital drive signal 1011 of the time controller 1005 controls the switch 1004 in such a way that the analog signal of the digital/analog converter 1002 is mapped onto the corresponding time ranges of the pixels.

The output of the switch 1004 is connected to an output stage 1006 including a driver 1007, the laser 1008 and also a supply voltage 1009 for the laser.

The switch 1004 includes a so-called sample-and-hold stage. The latter holds an analog input value or stores the latter for a predefined time period even if the input value is no longer present at the sample-and-hold stage.

The time controller 1005 is parameterized by the drive signal 1011, drives the switch 1004 in accordance with the value of the drive signal 1011 and thus attains a delay of the sample-and-hold stage corresponding to the drive signal 1011.

The time controller 1005 and possible implementations and configurations thereof are described below.

Figure 11:
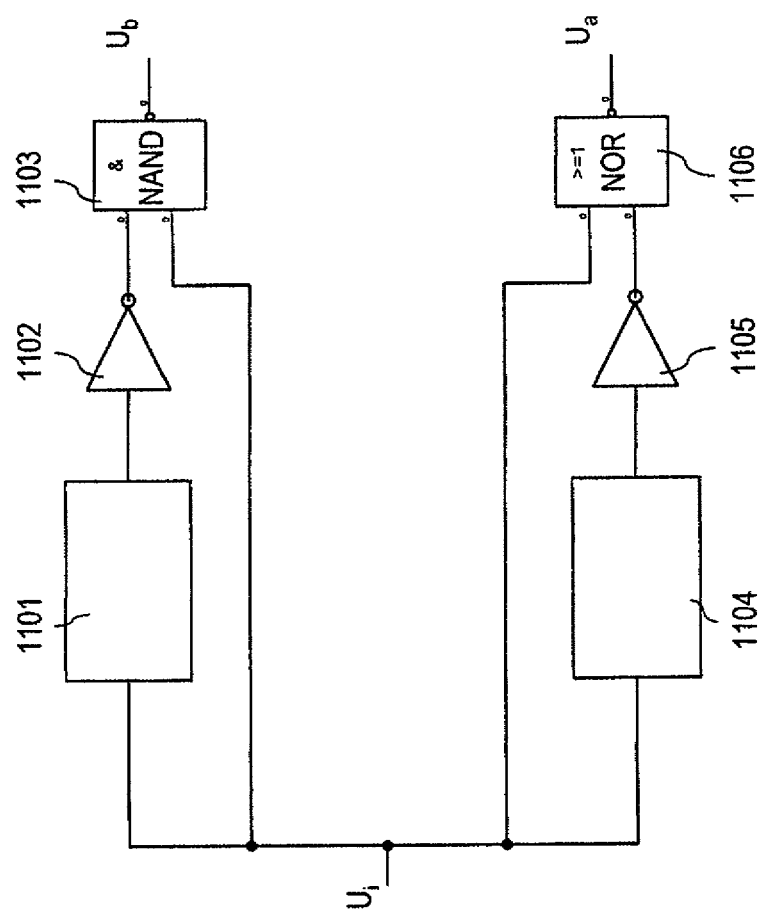
FIG. 11 shows a block diagram of a circuit on the basis of which pulses can be generated edge-selectively with a predefined width.
Figure 12:
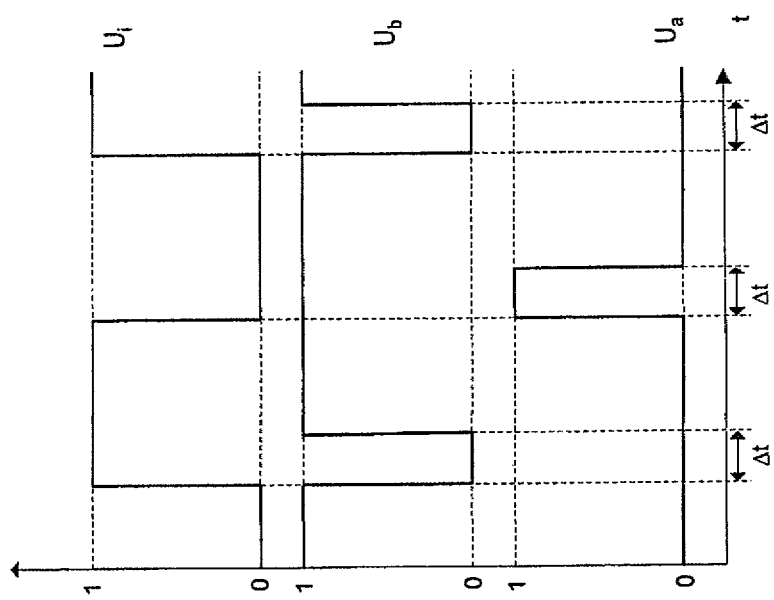
FIG. 12 shows a timing diagram associated with FIG. 11.

Firstly, FIG. 11 shows a block diagram of a circuit on the basis of which pulses can be generated edge-selectively with a predefined width. FIG. 12 shows a timing diagram associated with FIG. 11.

FIG. 11 shows an input signal $U_i$, which is present at one input of a NAND gate 1103 and also at one input of a NOR gate 1106. Furthermore, the input signal $U_i$ is connected to the other input of the NAND gate 1103 via a delay stage 1101 and a downstream inverter 1102. The input signal $U_i$ is also connected to the other input of the NOR gate 1106 via a delay stage 1104 and downstream inverter 1105. The NAND gate 1103 supplies a voltage $U_b$ as an output signal, and the NOR gate 1106 supplies a voltage $U_a$ as an output signal.

The delay stages 1101 and 1104 delay the signal by a time duration $\Delta t$ in each case.

The voltage profiles $U_i$, $U_a$ and $U_b$ are illustrated in the timing diagram of FIG. 12.

The idealized timing diagram of FIG. 12 shows that a rising edge of the input signal $U_i$ has the effect that the voltage $U_b$ changes from "1" to "0" for the time duration $\Delta t$. A falling edge of the input signal $U_i$ correspondingly causes the voltage $U_a$ to change from "0" to "1" for the time duration $\Delta t$.

Figure 13:
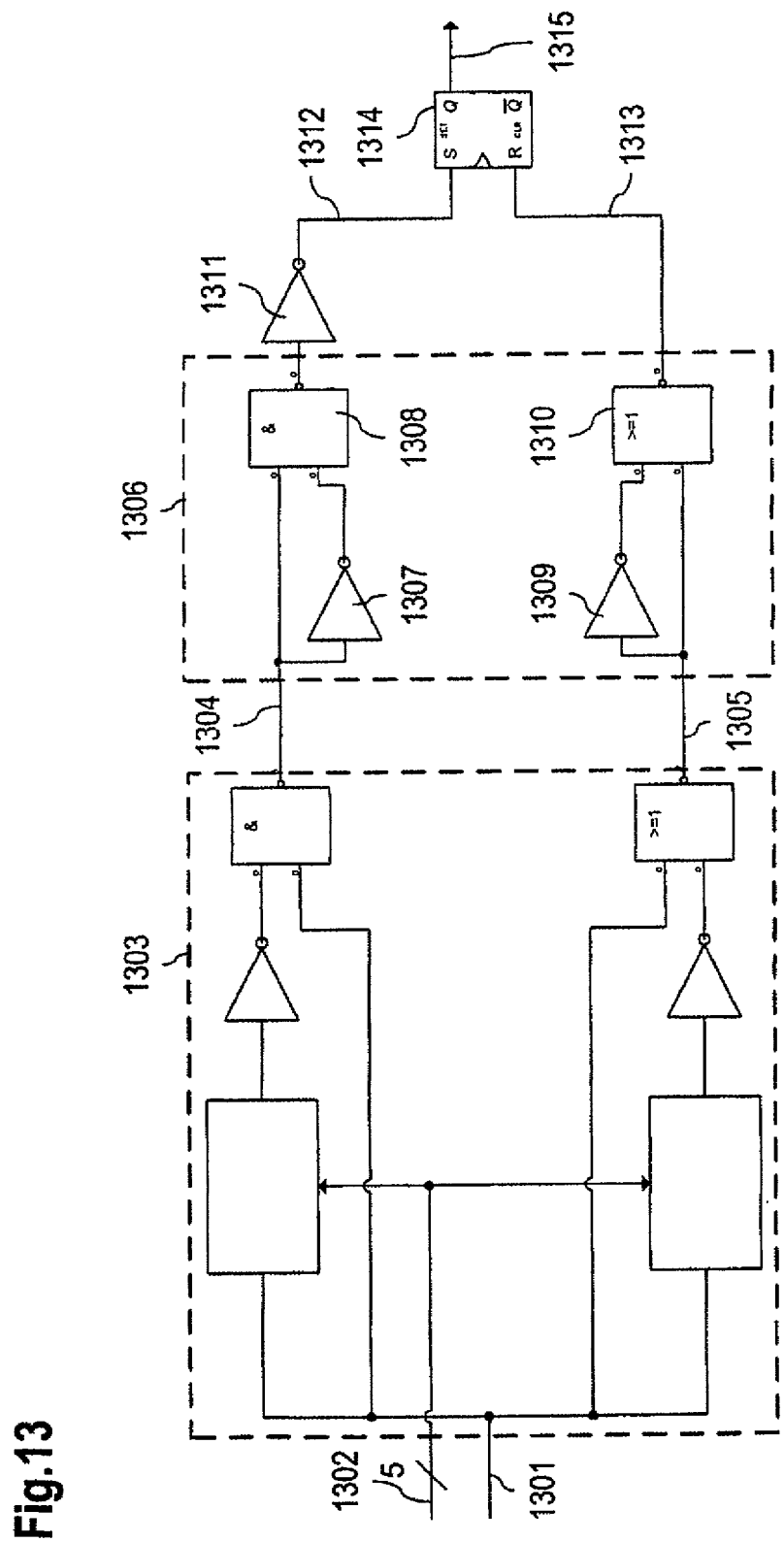
FIG. 13 shows a block diagram for edge-selective generation of pulses having a predefined width.

FIG. 13 shows a block diagram for edge-selective generation of pulses having a predefined width.

FIG. 13 includes a block 1303, which substantially corresponds to the block circuit in accordance with FIG. 11. In contrast to FIG. 11, instead of the input signal $U_i$, a (preprocessed) pixel clock 1301 is applied into the block 1303. Furthermore, the respective delay stages are adjustable on the basis of a control signal (control parameter) 1302. A signal 1304 (instead of the voltage $U_b$ from FIG. 11) and also a signal 1305 (instead of the voltage $U_a$ from FIG. 11) are available at the output of the block 1303.

Connected downstream of the block 1303 is a unit 1306 for pulse generation (pulse generator) including two inverters 1307 and 1309 and also a NAND gate 1308 and a NOR gate 1310. The signal 1304 is connected to the NAND gate 1308 in one instance directly and in one instance via the inverter 1307. The signal 1305 is connected to the NOR gate 1310 in one instance directly and in one instance via the inverter 1309.

The output of the NAND gate 1308 is connected to a SET input of a flip-flop 1314 via an inverter 1311. The output of the NOR gate 1310 is connected to a RESET input of the flip-flop 1314. The flip-flop 1314 is embodied, in particular, as an RS flip-flop.

The signal tapped off at the output of the NAND gate 1308 is designated as signal 1312 and the signal tapped off at the output of the NOR gate 1310 is designated as signal 1313. A drive signal 1315 is tapped off at a Q-output of the flip-flop 1314.

Figure 14:
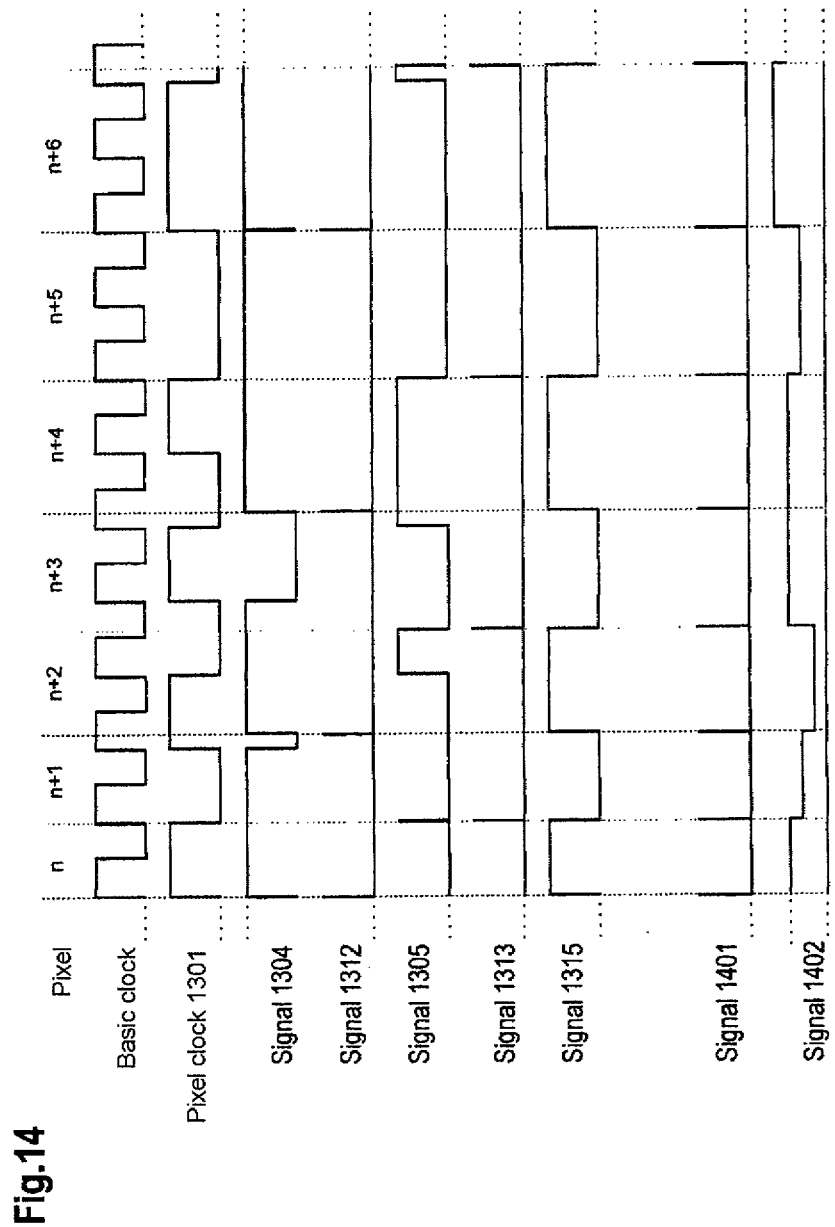
FIG. 14 shows a timing diagram associated with FIG. 13, in particular as a function of pixels n, n+1, etc., and as a function of a basic clock.

FIG. 14 shows a timing diagram associated with FIG. 13, in particular as a function of pixels n, n+1, etc., and as a function of a basic clock.

For the pixel n, the basic clock is synchronous with the pixel clock 1301 since, by way of example, the pixel n is that pixel at which the projection beam has the highest speed and, therefore, the shortest time period is available for said pixel n among all of the pixels.

The signal 1304 describes the output signal of a first delay stage. Upon each transition of the pixel clock 1301 from logic "0" to logic "1" (rising edge), a logic "0" pulse is generated for the signal 1304 under the condition that the signal 1305 is logic "0" at this point in time. This is not the case for the pixel n+4 (signal 1305 is logic "1" in the case of rising edge of the pixel clock 1301) and, in this respect, here there is no falling edge in the signal 1304.

The signal 1305 has a transition to logic "1" upon each falling edge of the pixel clock 1301.

The pulse widths of the signals 1304 and 1305 are dependent on the control signal 1302 (see FIG. 13).

The rising edge (transition from logic "0" to logic "1") of the signal 1304 and the falling edge (transition from logic "1" to logic "0") of the signal 1305 in each case generate the short pulses in accordance with signal 1312 and in accordance with signal 1313. These pulses serve for setting (on the basis of the signal 1312) and resetting (on the basis of the signal 1313) the flip-flop 1314.

The signal 1315 at the Q output of the flip-flop 1314 serves for driving the sample-and-hold stage.

This approach has the advantage that the drive signal 1315 of the sample-and-hold stage is asynchronous with the basic clock and, consequently, a high spatial resolution of the projection system can be achieved. Consequently, the pulse width of the drive signal 1315 of the sample-and-hold stage can be altered and take account of the fact that a pixel in the image center ("pixel n") has a shorter time duration than a pixel at the edge of the projected image, in particular that the time duration increases from the pixel n in the direction of the edges.

In this case, the pulse width of the logic "1" pulse for the pixel n is smaller than the pulse width of the logic "0" pulse for the pixel n+1. That means that the pulse widths of the logic "1" pulse and of the logic "0" pulse constantly increases from the image center as far as the image edge of the projected image.

If this pulse width of the drive signal 1315 requires an integral multiple of the period duration of the basic clock (as for pixel n+4, for example in FIG. 14), the pixel clock 1301 is halved (starting from pixel n+5, the pixel clock 1301 is halved with respect to the pixel n+4), in which case the edges of the pixel clock 1301 represent the temporal reference for the circuit in accordance with FIG. 13 and, consequently, the signals 1304 and 1305 are correspondingly generated from the altered pixel clock 1301 starting from the pixel n+5.

The edges of the drive signal 1315 determine a control signal 1401 of the sample-and-hold stage in accordance with FIG. 10. With each pulse of the control signal 1401, the switch 1004 in FIG. 10 is closed for the time duration of the pulse. The output value of the digital/analog converter is thus stored by the sample-and-hold stage for this time duration and forwarded to the output stage 1006. This signal for the output stage 1006 is represented as signal 1402 in FIG. 14.

The width of the pulses is determined by the control signal 1302 (see FIG. 13) of the digital interface. This enables the precise temporal assignment of the time range required for each pixel to the respective position of the pixel on the projection area.

Since the time duration per pixel increases continuously from the image center in the direction of the edge regions, it is possible to provide, instead of a digital interface (having a width of 4-bits, for example), a controlled counter which autonomously predefines the respectively required delay of the pixels. This has the advantage that the width of a databus can be reduced.

Contrast Enhancement

Figure 15:
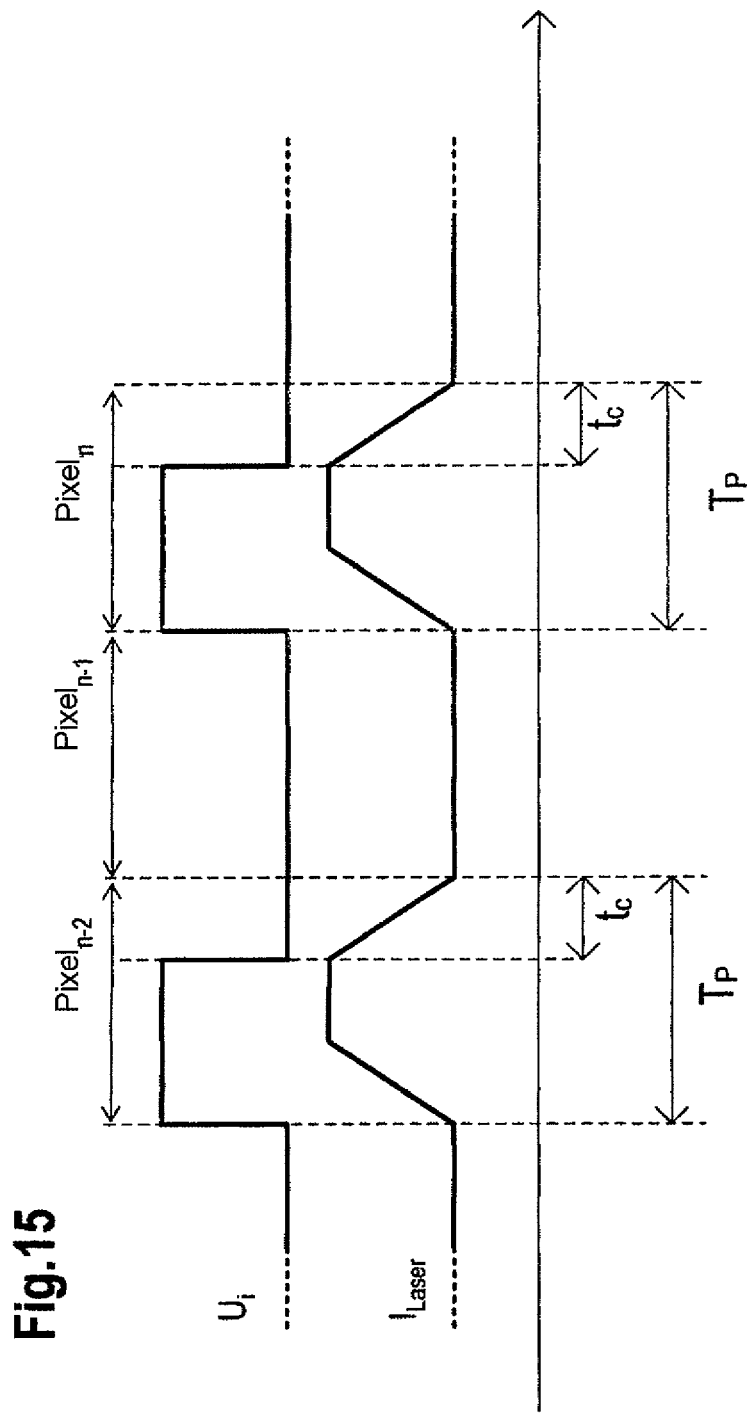
FIG. 15 shows a diagram with temporal profiles of drive signals for a laser, wherein the driving duration can be changed as a function of pixel contents and of rise and/or fall times of the modulation current required for the laser.

FIG. 15 shows a diagram with temporal profiles of drive signals for a laser, wherein the driving duration can be changed as a function of pixel contents and also of rise and/or fall times of the modulation current required for the laser.

Figure 5:
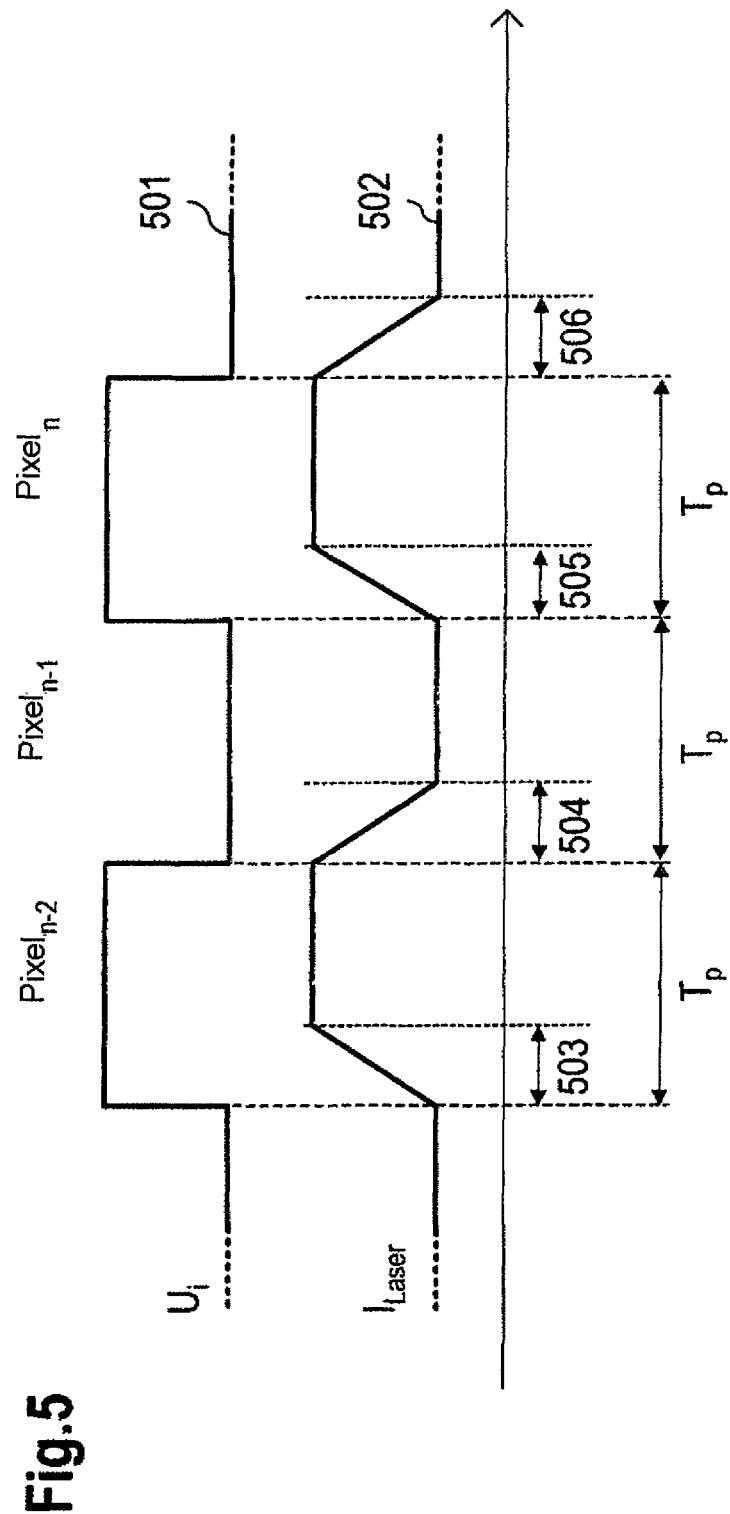
FIG. 5 shows in a correspondingly simplified manner a drive voltage for a laser and a resultant current through the laser.

FIG. 5 shows the driving of the laser without the approach for compensation as presented here. Without compensation, unambiguous separation of adjacent pixels is not possible.

By contrast, the compensation in accordance with FIG. 15 permits unambiguous separation of adjacent regions: each pixel requires a time duration $T_p$. Rising and falling edges each requiring a specific time duration $t_c$ arise as a result of the finite switching times of the laser. Said time duration $t_c$ is dependent, in particular, on a pixel information item, e.g. an amplitude or brightness of a subsequent or preceding pixel.

The compensation presented here makes it possible that, substantially upon the elapsing of the time duration for a pixel, the latter has already been set to the information (amplitude or brightness) of the subsequent pixel. This holds true particularly if the amplitude of the subsequent pixel is smaller than the amplitude of the current pixel.

What is thus achieved is that a reduction of the amplitude of a pixel to the value of the amplitude of the adjacent or spatially closest pixel is concluded before the time range $T_p$ of the adjacent or spatially closest pixel begins.

This behavior can be described by the following expressions depending on intensities I.

Contrast Definition:

$$K = \frac{I_{max} - I_{min}}{I_{max} + I_{min}}$$

Contrast Ratio:

$$K_v : 1 = \frac{I_{max}}{I_{min}} : 1$$

FIG. 16 shows a table that compares variables such as contrast, contrast ratio, maximum intensity and minimum intensity for the cases with and without compensation.

The time $t_{rf}$ indicated in FIG. 16 is required to reach 100% from 0% of the maximum intensity. In practice, a time duration required by the maximum intensity to reach 90% of its value from 10% is preferably assumed for $t_{rf}$. Furthermore, a linear rise (including for a range from 0% to 100%), can be assumed for this in a simplifying manner.

Figure 17B:
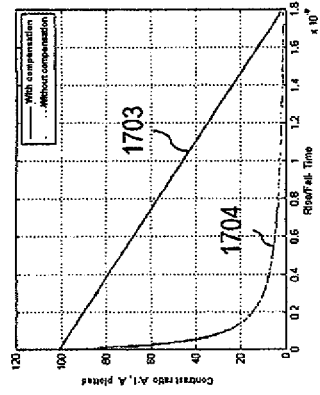
FIG. 17B shows a comparison of the contrast ratio with compensation and without compensation as a function of the rise and/or fall time of the edge.
Figure 17A:
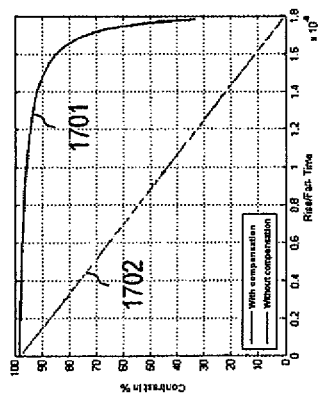
FIG. 17A shows a comparison of the contrast with compensation and without compensation as a function of a rise and/or fall time of an edge.

FIG. 17A shows a comparison of the contrast with compensation (Graph 1701) and without compensation (Graph 1702) as a function of a rise and/or fall time of an edge.

FIG. 17B shows a comparison of the contrast ratio with compensation (Graph 1703) and without compensation (Graph 1704) as a function of the rise and/or fall time of the edge.

Figure 17C:
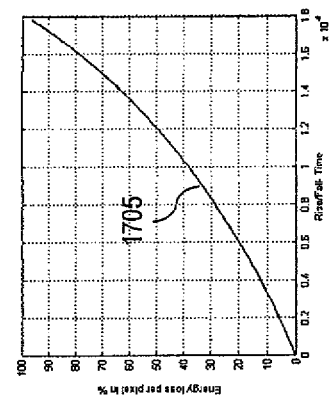
FIG. 17C shows an energy loss and hence a brightness loss as a result of the compensation of the non-ideal edge as a function of a rise and/or fall time of the edge.

FIG. 17C shows an energy loss and thus a brightness loss 1705 as a result of the compensation of the non-ideal edge as a function of the rise and/or fall time of the edge.

By way of example, the graphs shown in FIGS. 17A, 17B and 17C are based on the following parameters:

$$T_p = 18 \text{ ns } \frac{A_{Offset}}{A_{max}} = 0.01$$

The parameter $A_{Offset}/A_{max}$ arises as a result of the influence of extraneous light and as a result of a spatial expansions of the projection beam.

Comparison of the graphs of FIG. 17A and FIG. 17B reveals a significant enhancement of the contrast and of the contrast ratio for the same edge steepness as a result of the compensation described here. Thus, by way of example, a contrast of 85% and a contrast ratio of 15:1 arise without compensation, in contrast to 98% as contrast and 90:1 as contrast ratio with compensation, with an edge steepness of 2 ns being taken into account.

If a contrast ratio of 90:1 is intended to be achieved, for example, this results in a rise and/or fall time of 2 ns with 5% brightness loss with the compensation method described or less than 200 ps with 0% energy loss without the compensation method.

It is thus evident that a contrast ratio of 90:1 cannot be realized without the compensation method presented here. A brightness loss caused by the compensation method can be compensated for by adapting the modulation current of the lasers.

Figure 18:
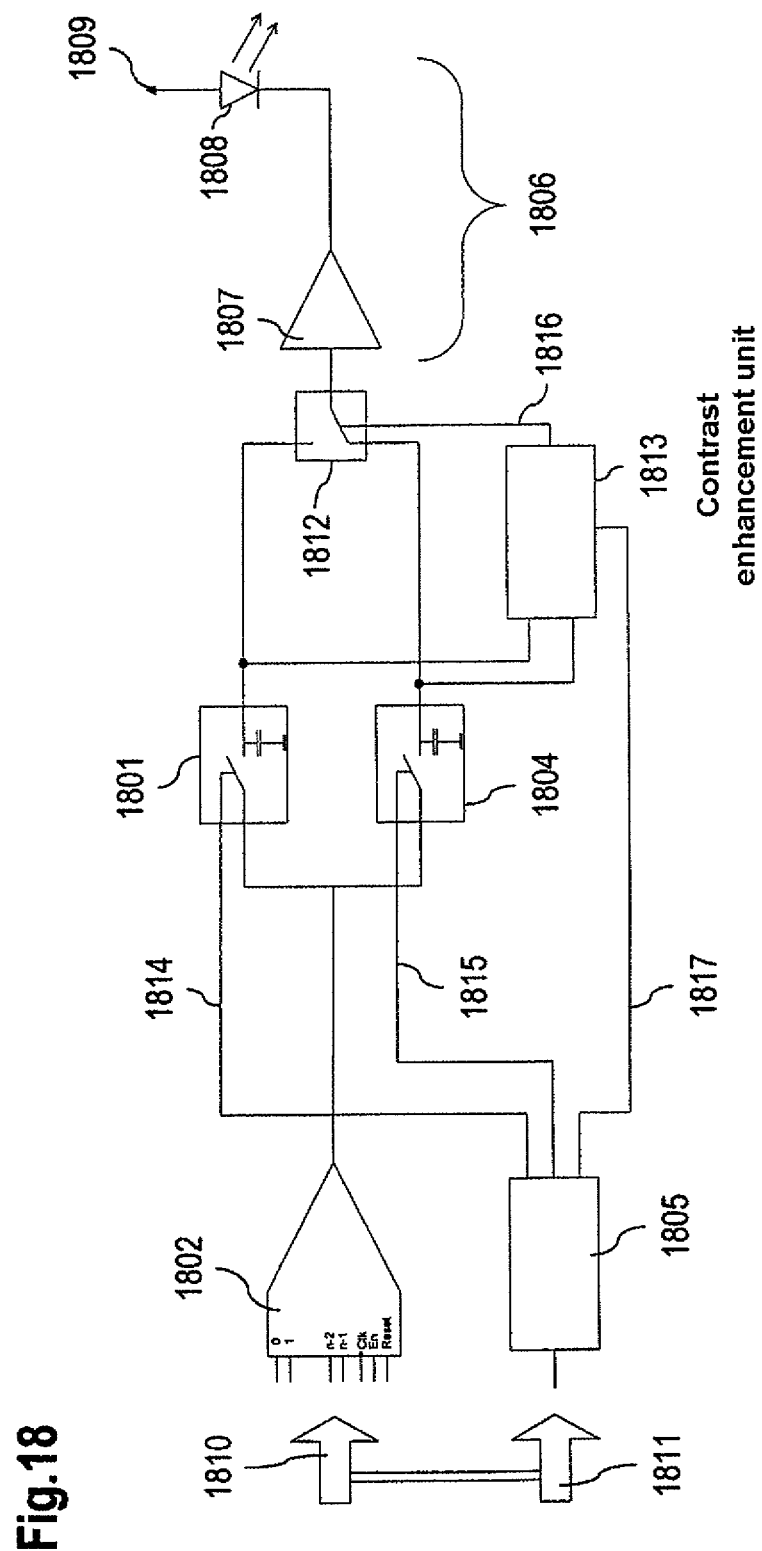
FIG. 18 shows a block diagram for the driving of a laser by means of a contrast enhancement unit.

FIG. 18 shows a block diagram for the driving of a laser 1808 by means of a contrast enhancement unit 1813.

A digital signal 1810 having a width of n-bits is converted into an analog signal by a digital/analog converter 1802 (DAC) and applied to a switch 1801 and also to a switch 1804. The switch 1801 includes a sample-and-hold stage triggered by a signal 1814, and the switch 1804 includes a sample-and-hold stage triggered by a signal 1815.

The output of the switch 1801 is connected to a switch 1812. The output of the switch 1804 is likewise connected to the switch 1812, the switch 1812 connecting its output either to the output of the switch 1801 or to the output of the switch 1804 by means of a switching signal 1816.

The output of the switch 1801 and the output of the switch 1804 are respectively connected to inputs of the contrast enhancement unit 1813, and the output of the unit 1813 supplies the switching signal 1816 for the switch 1812.

A time controller 1805 is parameterized by a digital drive signal 1811, a respective output of the time controller 1805 providing the signal 1814, the signal 1815 and a signal 1817 for driving the contrast enhancement unit 1813.

The output of the switch 1812 is connected to an output stage 1806 including a driver 1807, the laser 1808 and also a supply voltage 1809 for the laser.

The switches 1801 and 1804 in FIG. 18 include or write to a respective sample-and-hold stage, as an analog storage element that to store an output voltage of the digital/analog converter 1802 for a predefined time duration (which is long particularly in relation to a time duration required for the representation of an individual pixel).

In FIG. 18, two such sample-and-hold stages are provided in the form of the switches 1801 and 1804. A plurality of switches and/or storage stages can correspondingly be present.

The contrast enhancement unit 1813 compares an amplitude value of a current pixel with an amplitude value of a subsequent pixel. A switch-over instant for the switch 1812 is determined in a manner dependent on the amplitude difference between the amplitude values stored in the switches 1801 and 1804.

The switch 1812 switches over between the signals present at the switches 1801 and 1804 and forwards the switched-through signal to the output stage 1806.

The switches 1801 and 1804 are driven by the time controller 1805 (which is embodied as a digital processing stage, in particular) by means of the signals 1814 and 1815. The time controller 1805 is parameterized, in particular, by means of the digital interface of the imaging system.

In this case, the parameterization includes, in particular, a predefinition of specific system properties, e.g. a determined edge steepness.

The contrast enhancement unit 1813 switches over the switch 1812 by means of the signal 1816, in accordance with the voltage values stored in the switches 1801 and 1804 and acquires control signals 1817 from the time controller 1805.

Figure 1:
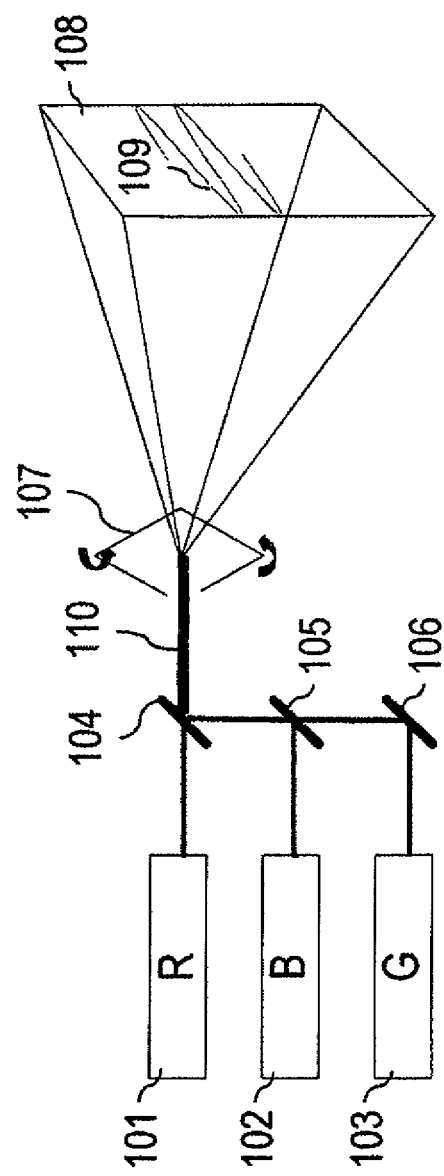
FIG. 1 shows a schematic diagram for illustrating the functional principle of a "flying spot" projection.
Figure 2:
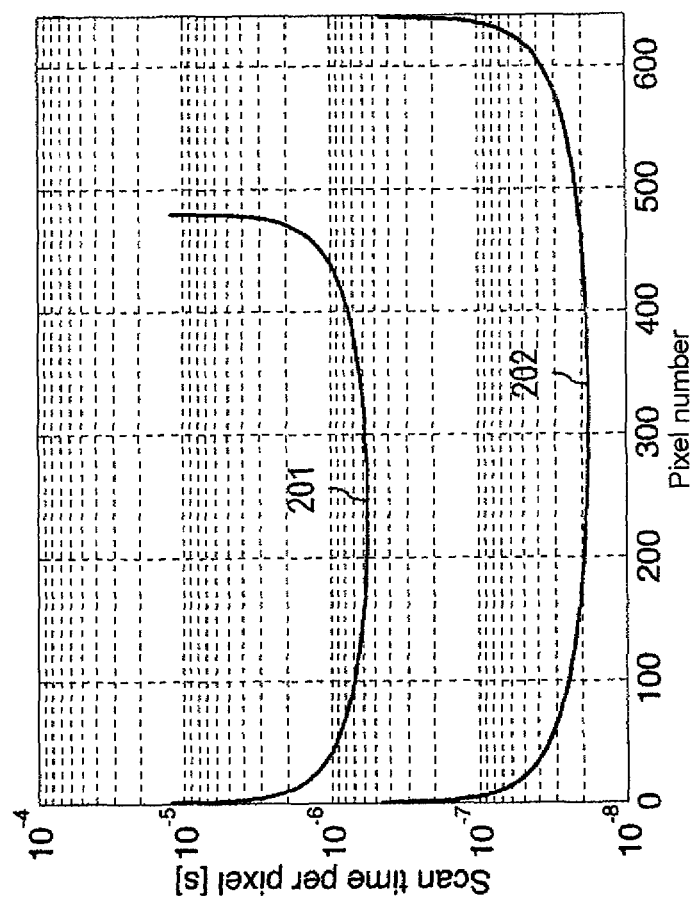
FIG. 2 shows an illustration of scan time ranges per pixel in seconds as a function of a position of the respective pixel for a column and for a line.
Figure 3:
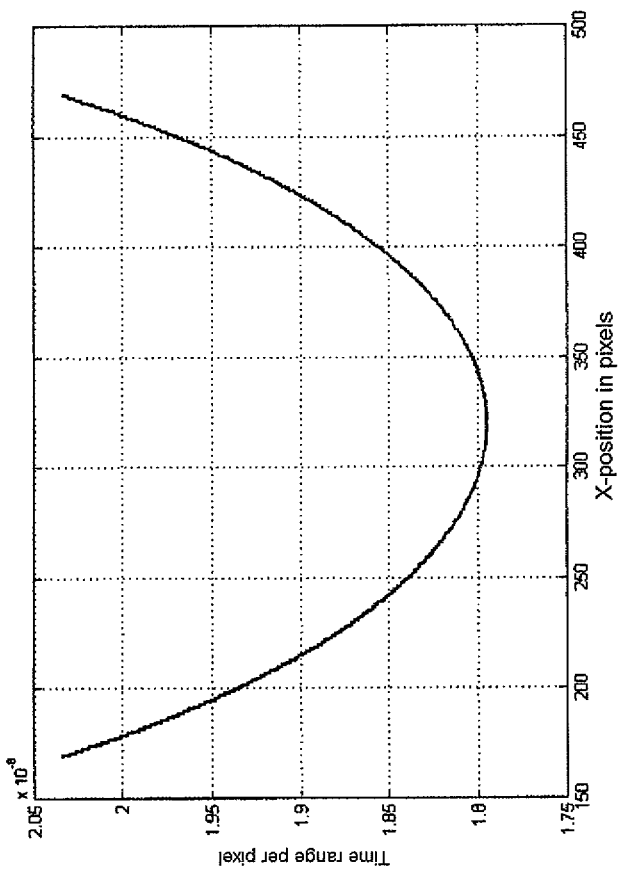
FIG. 3 shows an excerpt from FIG. 2 for the time ranges along a (horizontal) line in the region of the center of the image plane (image center)
Figure 4:
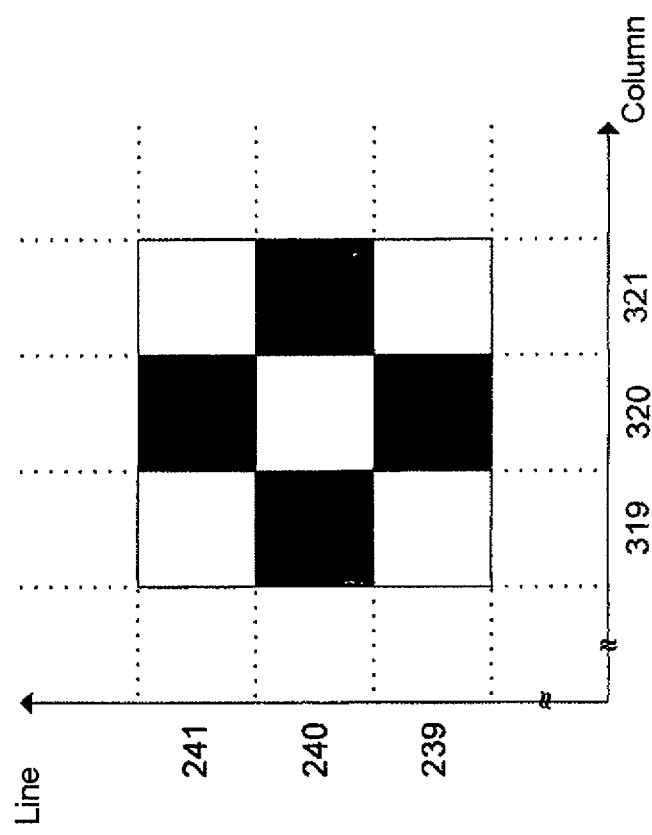
FIG. 4 shows by way of example an excerpt from an image to be projected in an image plane with the greatest possible contrast, that is to say a transition from white to black or vice versa between two respective pixels.
Figure 19:
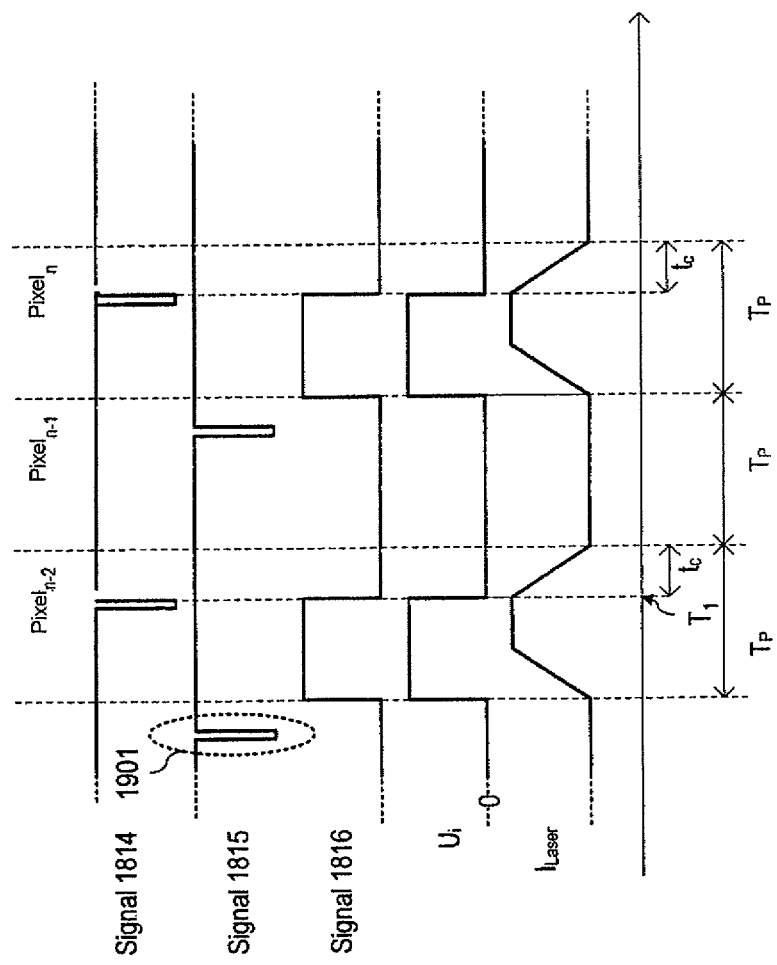
FIG. 19 shows a timing diagram associated with FIG. 18 on the basis of the projection of a checkered pattern in accordance with FIG. 4.

FIG. 19 shows a timing diagram associated with FIG. 18 on the basis of the projection of a checkered pattern in accordance with FIG. 4.

Directly before the beginning of a time duration $T_p$ required for a subsequent pixel n−2, the switch 1804 is closed. This is represented by a pulse 1901 of the signal 1815 for the driving of the switch 1804.

The information concerning the amplitude of the pixel n−2 is thus present and can be forwarded to the output stage 1806 by means of the switch 1812.

At the latest at an instant $$T_1 = T_p - t_c$$

the image information of the pixel n−1 is buffer-stored with the aid of the sample-and-hold stage of the switch 1801.

Consequently, at the instant $T_1$, information items concerning the amplitude of the current pixel n−2 and also the amplitude of the subsequent pixel n−1 are available to the contrast enhancement unit 1813. The contrast enhancement unit 1813 can thus determine a switch-over instant for the switch 1812 given a known edge steepness.

This efficiently compensates for an effect of blurring between individual pixels and thus greatly enhances the contrast between pixels of different brightnesses.

The time duration $t_c$ can be estimated to a first approximation with the assumption that the rise in the current $I_{Laser}$ in the case of an abrupt change in the input signal $U_i$ is linear over time. The following thus approximately holds true:

$$t_c = \frac{I_{n-1} - I_{n-2}}{I_{max} - I_{min}} \cdot t_{rf},$$

where I denotes an intensity and $t_{rf}$ denotes a time required for an edge rise or fall.

For the case where the subsequent pixel n−1 requires a higher modulation current than the current pixel n−2, it preferably follows that $t_c=0$.

That means that the time range of a pixel is adapted only when two adjacent pixels have a difference in brightness. This procedure serves to increase the efficiency and/or the image brightness.

Figure 20:
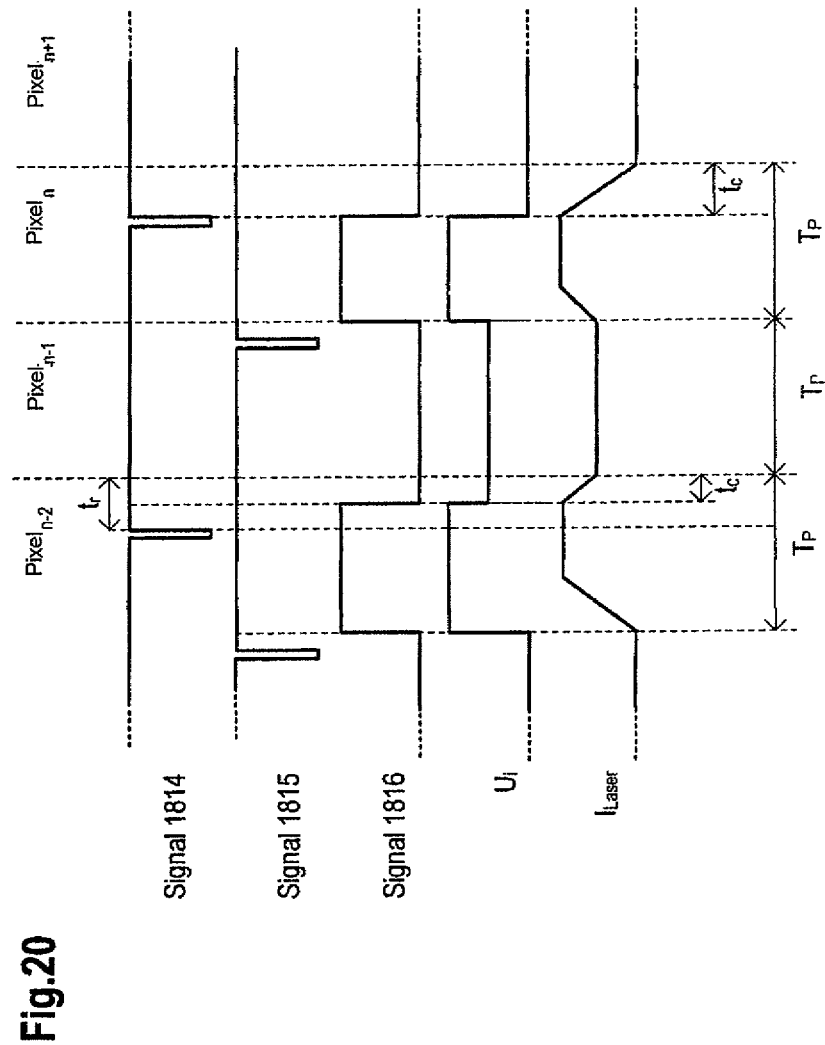
FIG. 20 shows a timing diagram associated with FIG. 18 on the basis of the projection of different bright pixels, wherein a pixel n−1 has a brightness that is only slightly reduced by comparison with a pixel n−2.

FIG. 20 shows a timing diagram associated with FIG. 18 on the basis of the projection of different bright pixels. In particular, a pixel n−1 has a brightness that is only slightly reduced by comparison with a pixel n−2.

The rising edges of the signals 1814 and 1815 serve for temporal synchronization with the basic clock. The signal 1816 in turn preferably corresponds to a signal manipulated by delay elements.

The time difference between the rising edge of the signal 1815 and the rising edge of the signal 1816 and also between the rising edge of the signal 1814 and the falling edge of the signal 1816 is dependent on the image information of the successive pixels depending on color.

A transition from the pixel n−2 to the pixel n−1 is considered below by way of example.

In the clearest case, the amplitude difference between two temporally successive pixels corresponds to the maximum dynamic range of the output stage 1806. Since it can be assumed that the parasitic capacitances of the laser diode are subjected to charge reversal by means of a constant current $I_{Laser}$, edges of finite steepness arise for a shunt current through the laser diode. This maximum rise and/or fall time corresponds to a time duration $t_r$ between the rising edge of the signal 1814 and the falling edge of the signal 1816. The maximum rise and/or fall time is preferably known to the system.

The time duration $t_c$ indicates how long the output signal $I_{Laser}$ requires to build up or reduce the amplitude difference between adjacent pixels. The time difference between the rising edge of the signal 1814 and the falling edge of the signal 1816 thus results as:

$\Delta t = t_r - t_c$.

In the case of the maximum amplitude difference between the adjacent pixels, said time difference is $\Delta t$–0.

This relationship is shown in FIG. 20 in the transition from the pixel n to the pixel n+1.

Consequently, time duration $t_r$ can also be regarded as a time buffer that is reduced depending on the amplitude difference.

In particular, there is therefore a relationship between the time duration $t_c$ and the amplitude difference, such that the time duration $t_c$ is calculated anew by the electronics upon each transition between from one pixel to the next pixel. This preferably takes place in real time.

The relationship between the signals 1815 and 1816 can be described in a manner corresponding to the above explanations concerning the relationship between the signals 1816 and 1814.

Figure 21:
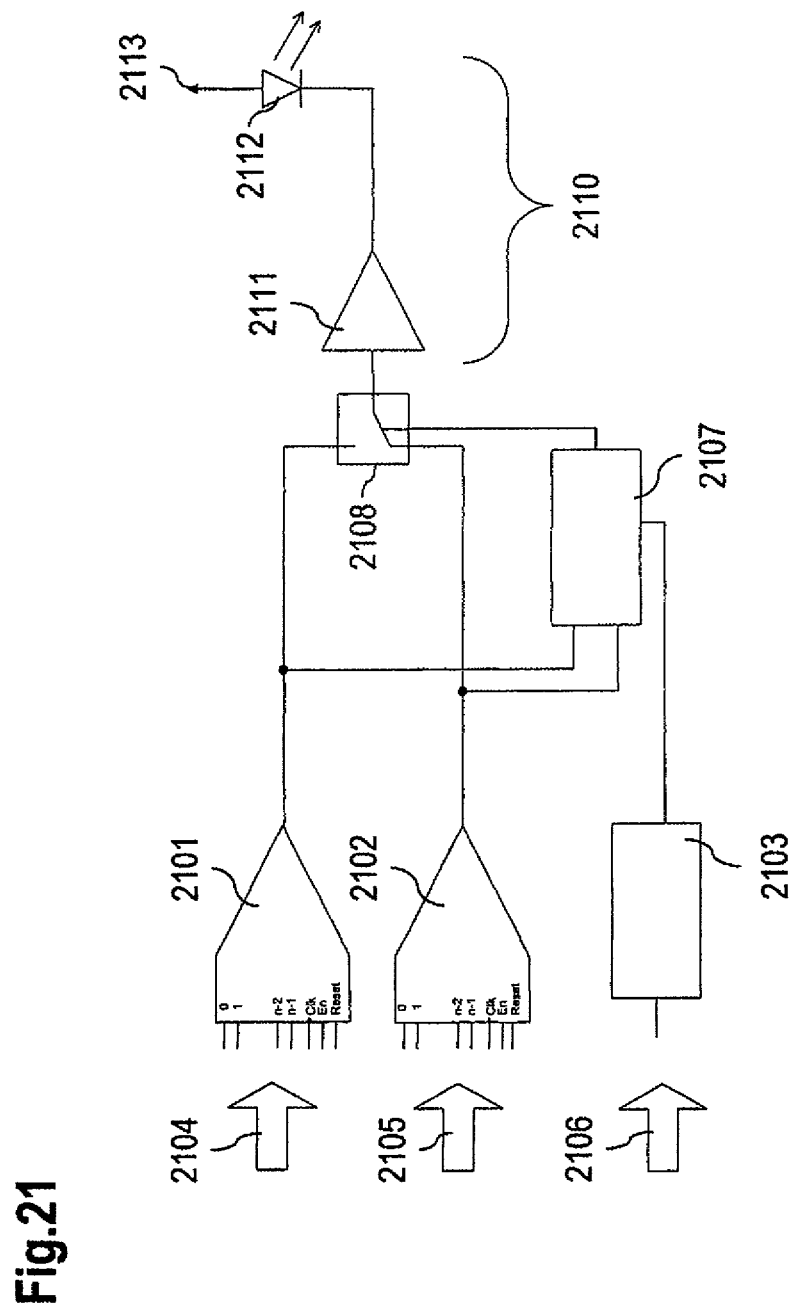
FIG. 21 shows an alternative configuration of a block diagram for the driving of a laser by means of a contrast enhancement unit, wherein two digital/analog converters are used instead of the two sample-and-hold stages in accordance with FIG. 18.

An alternative configuration for the driving of a laser 2112 by means of a contrast enhancement unit 2107 is illustrated in FIG. 21.

FIG. 21 shows two digital/analog converters 2101 and 2102, to which digital image data 2104 and 2105 are respectively applied. A changeover switch 2108 switches over between the analog outputs of the digital/analog converters 2101 and 2102 and connects the respectively switched-through analog signal to an output stage 2110.

The output stage 2110 includes a driver 2111, the laser 2112 and also a supply voltage 2113 for the laser.

Furthermore, a time controller 2103 is provided which is parameterized by a digital signal 2106, an output of the time controller 2103 providing a signal for the contrast enhancement unit 2107.

The contrast enhancement unit 2107 includes two inputs, one of which respectively is connected to the output of the digital/analog converter 2101 and 2102 respectively. The output of the contrast enhancement unit 2107 supplies a signal for driving the switch 2108.

One advantage of the circuit in accordance with FIG. 21 consists in the fact that the switches 1801 and 1804 in accordance with FIG. 18 can be obviated since the amplitude values of adjacent pixels are provided by a respective digital/analog converter 2101 and 2102 and are held over a predefined time period.

In this case, it is advantageous that a maximum required processing speed for each of the digital/analog converters 2101 and 2102 is reduced by comparison with the digital/analog converters 1802 from FIG. 18 since, for the digital/analog converters 2101 and 2102, a time period of $2 \cdot T_p - t_c$ is available for performing the conversion.

As has been explained above in connection with FIG. 18 and FIG. 19, the switch-over of the switch 2108 (switch 1812 in FIG. 18) is not effected synchronously with the pixel clock.

Figure 22:
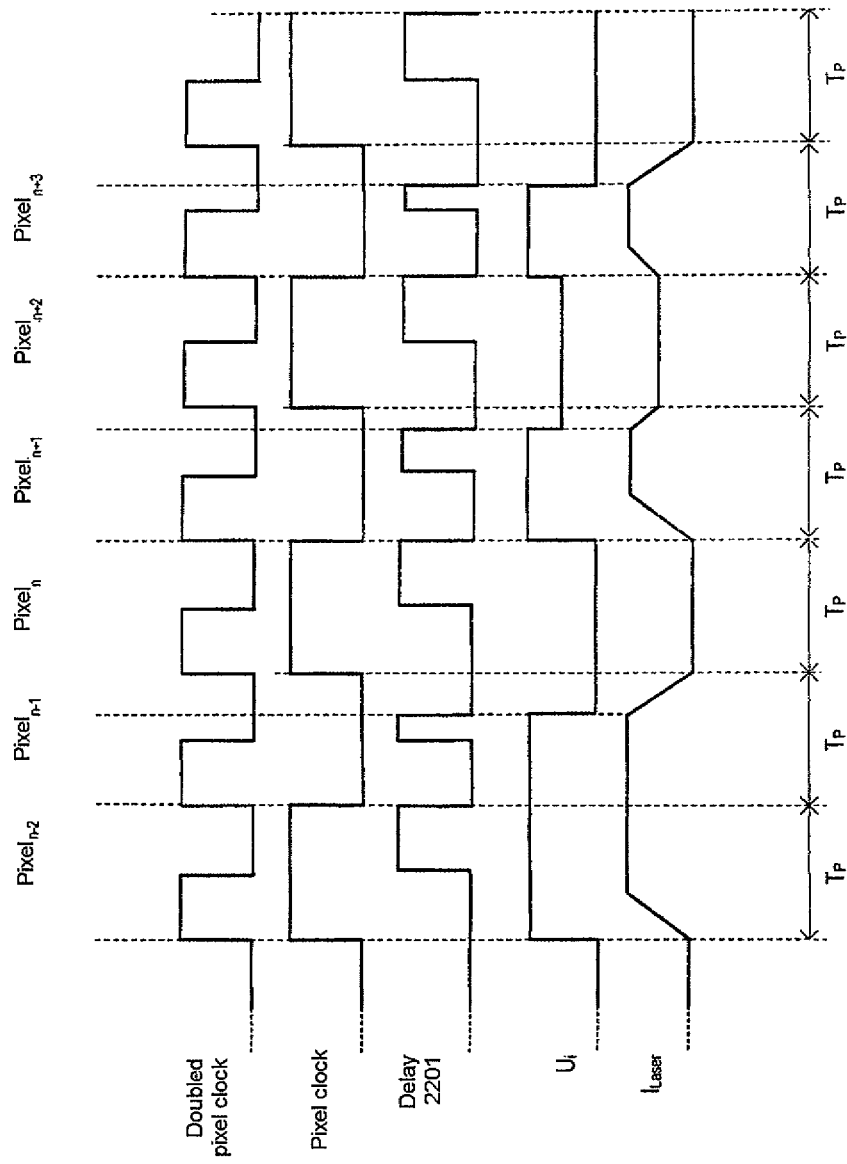
FIG. 22 shows a timing diagram associated with FIG. 21.

FIG. 22 shows a timing diagram associated with FIG. 21. In the time controller 2103, the changing pixel clock is doubled. This increase in frequency is preferably effected electronically by means of an edge-triggered flip-flop which reacts selectively to the falling and also the rising edge of the input clock with a state change.

For simplified illustration, the pixel clock is illustrated as constant in FIG. 22.

In particular, for simplification, it is also possible to use only the falling edges of the doubled pixel clock as a time base. The amplitude difference determined by the contrast enhancement unit 2107 is converted into a delay of the doubled pixel clock by an analog circuit (see signal 2201 in FIG. 22).

By means of a combination of the original signal and of the signal 2201 by means of logic gates, an edge-selective pulse arises.

A stage which generates pulses having a specific width in an edge-selective manner is illustrated in FIG. 11 and FIG. 12.

In this case, the width of the generated pulse corresponds to the delay Δt or to the propagation time difference of the two signal lines which end in the logic gate (NAND or NOR). Two edges are thus available as a reference: the rising edge of the doubled pixel clock and the falling edge of the output signal of the delay circuit explained. Both lead to a switch-over of the switch 2108 in FIG. 21 or of the switch 1812 in FIG. 18. Consequently, digital driving can be carried out successfully.

Combination: Improvement of the Spatial Assignment and Enhancement of the Contrast The approaches explained above can advantageously be combined with one another.

By way of example, it is possible to increase the contrast by means of the functionality of the above-described units for improving the spatial assignment, which is preferably driven by the time controller and, for its part, drives a switch (changeover switch).

The spatial assignment is made possible, as described, by the parameterized closing of at least one switch and of the at least one sample-and-hold stage connected thereto.

An assignment error can correspondingly also be compensated for in the time controller.

Compensation of Mounting Inaccuracies

FIG. 10 illustrates a possible solution for the spatial assignment of pixels. If the parameterization of the time controller 1005 is correspondingly predefined, this results in a corresponding predistortion of the projected image.

This predistortion can at least partly compensate for a mounting inaccuracy of optical units or of the laser in a sub-pixel region (that is to say in a region which is smaller than a pixel).

If, by way of example, the mounting error has an effect on the projection plane in such a way that the respectively illuminated image regions of the individual lasers differ by not more than one pixel, the image information of the digital source can be preprocessed by means of delays of the individual laser sources with respect to one another such that the error is compensated for (that is to say that the pixel is correspondingly correctly imaged on the projection plane by means of the electronics).

Further Advantages:

The approaches presented here make it possible to decouple the data interface and the conversion rate of the digital/analog converter from the high temporal requirements made of the amplitude modulation of the respective light source, in particular of the laser.

The approach makes it possible to provide a laser projection system on the basis of the "flying spot" method with improved image quality since it is possible to represent pixels with high temporal resolution and thus high spatial resolution in conjunction with little error.

A further advantage is the simpler and more expedient technical realizability of the digital/analog converters and reduced requirements made of the interfaces of the imaging system since no temporal quantizations of the shortest pixels and thus no multiplication of the processing speed are required.

A further advantage consists in the fact that the required delay does not have to be realized in a color-specific manner and, accordingly, the individual delay stages of the three colors can be parameterized by means of an interface having a small bit width.

As an alternative, it is also possible for the delay to be implemented separately per color, such that, by way of example, the inaccuracy of the mounting of the respective light sources can be compensated for by corresponding manipulation of the time division multiplex method.

A further advantage consists in the fact that even in the case of a relatively pronounced influence of the edge steepness, a high contrast can be attained. The requirements made of the analog electronics for short switching times and correspondingly steep edges are decreased as a result. Furthermore, the requirements made of the technology of the analog driver circuit that provides the modulation current are reduced.

List of Reference Symbols:

| | |
|---|---|
| 101 | Red light source |
| 102 | Blue light source |
| 103 | Green light source |
| 104 | Deflection mirror |
| 105 | Deflection mirror |
| 106 | Deflection mirror |
| 107 | Micromirror, in particular two-dimensional resonant micromirror |
| 108 | Image plane |
| 109 | Beam profile of the projection bean in the image plane |
| 110 | Common beam, projection beam |
| 201 | Curve for representing scan time ranges for a column per pixel in seconds as a function of a position of the respective pixel |
| 202 | Curve for representing scan time ranges for a line per pixel in seconds as a function of a position of the respective pixel |
| 501 | Drive voltage for laser |
| 502 | Laser current |
| 503 | Switch-on delay |
| 504 | Switch-off delay |
| 505 | Switch-on delay |
| 506 | Switch-off delay |
| 601 | Digital/analog converter (DAC) |
| 602 | Driver |
| 603 | Laser |
| 604 | Supply voltage (VDD) |
| 605 | Digital signal |
| 701 | Digital/analog converter (DAC) |
| 702 | Driver |
| 703 | Laser |
| 704 | Supply voltage (VDD) |
| 705 | Digital signal |
| 706 | Delay stage |
| 1001 | Delay stage |
| 1002 | Digital/analog converter |
| 1004 | Switch (with sample-and-hold stage) |
| 1005 | Time controller |
| 1006 | Output stage |
| 1007 | Driver |
| 1008 | Laser |
| 1009 | Supply voltage |
| 1010 | Digital signal |
| 1011 | Drive signal |
| 1101 | Delay stage |
| 1102 | Inverter |
| 1103 | NAND gate |
| 1104 | Delay stage |
| 1105 | Inverter |
| 1106 | NOR gate |
| 1301 | Pixel clock |
| 1302 | Control signal (control parameter) |
| 1303 | Block in accordance with FIG. 11 |
| 1304 | Signal at the output of the NAND gate |
| 1305 | Signal at the output of the NOR gate |
| 1306 | Unit for pulse generation (pulse generator) |
| 1307 | Inverter |
| 1308 | NAND gate |
| 1309 | Inverter |
| 1310 | NOR gate |
| 1311 | Inverter |
| 1312 | Signal at the output of the inverter 1311 |
| 1313 | Signal at the output of the NOR gate 1310 |
| 1314 | Flip-flop (RS flip-flop) |
| 1315 | Drive signal |
| 1701 | Curve profile for contrast with compensation as a function of a rise and/or fall time of an edge |
| 1702 | Curve profile for contrast without compensation as a function of a rise and/or fall time of an edge |
| 1703 | Curve profile for contrast ratio with compensation as a function of a rise and/or fall time of the edge |
| 1704 | Curve profile for contrast ratio without compensation as a function of a rise and/or fall time of the edge |
| 1705 | Curve profile for energy loss and thus brightness loss as a result of the compensation of the non-ideal edge as a function of the rise |

-continued

List of Reference Symbols:

| | |
|---|---|
| | and/or fall time of the edge |
| 1801 | Switch (with sample-and-hold stage) |
| 1802 | Digital/analog converter |
| 1804 | Switch (with sample-and-hold stage) |
| 1805 | Time controller |
| 1806 | Output stage |
| 1807 | Driver |
| 1808 | Laser |
| 1809 | Supply voltage |
| 1810 | Digital signal (having a width of n-bits) |
| 1811 | Digital drive signal |
| 1812 | Switch (changeover switch) |
| 1813 | Contrast enhancement unit |
| 1814 | Signal for triggering the sample-and-hold stage in switch 1801 |
| 1815 | Signal for triggering the sample-and-hold stage in switch 1804 |
| 1816 | Switching signal for switching over the switch 1812 |
| 1817 | Signal for driving the contrast enhancement unit 1813 |
| 1901 | Pulse |
| 2101 | Digital/analog converter |
| 2102 | Digital/analog converter |
| 2103 | Time controller |
| 2104 | Digital image data |
| 2105 | Digital image data |
| 2106 | Digital signal (for parameterization of the time controller 2103) |
| 2107 | Contrast enhancement unit |
| 2108 | Changeover switch |
| 2110 | Output stage |
| 2111 | Driver |
| 2112 | Laser |
| 2113 | Supply voltage |
| 2201 | Delay signal |

The invention claimed is:

1. A method for projecting at least one light beam, the method comprising:
lengthening at least in part a holding duration for at least one pixel with respect to at least one further pixel,
wherein a first information item of the pixel is altered in a manner dependent on a second information item,
wherein the first information item of the pixel is altered in a manner dependent on a second information item by a fall time required for the falling edge being subtracted from a duration of the pixel substantially at the end of the pixel.

2. The method as claimed in claim 1,
wherein at least in part the holding duration of the at least one pixel is lengthened depending on a location of the projection of the respective pixel,
wherein at least one digital/analog converter is used for driving the at least one light beam, wherein the digital/analog converter is operated with a basic clock,
wherein at least in part the holding duration for the at least one pixel is lengthened by a pixel clock being determined on the basis of the basic clock, the holding duration for the at least one pixel being lengthened on the basis of the pixel clock.

3. The method as claimed in claim 2, wherein the pixel clock corresponds to an integral multiple of the basic clock.

4. The method as claimed in claim 1, wherein the delay stage is driven by means of a drive signal.

5. The method as claimed in claim 4, wherein the delay stage comprises a sample-and-hold stage and a time controller, wherein the time controller is configured to control the sample-and-hold stage on the basis of the drive signal.

6. The method as claimed in claim 1, wherein the first information item of the pixel is altered during the time duration for the projection of the pixel.

7. The method as claimed in claim 1, wherein the first information item comprises at least one of an amplitude and a brightness for the representation of the pixel.

8. The method as claimed in claim 1, wherein the second information item comprises at least one of an amplitude and a brightness of at least one subsequent pixel.

9. The method as claimed in claim 1, wherein attaining the at least one subsequent pixel comprises one of the following criteria: upon, shortly before or shortly after attaining the at least one subsequent pixel; substantially upon, shortly before or shortly after attaining the spatial extent predefined for the pixel.

10. The method as claimed in claim 1, wherein a storage unit for at least one pixel is provided, for the comparison of the first information item of the pixel with the second information item.

11. The method as claimed in claim 10, wherein the storage unit comprises two sample-and-hold stages that are driven alternately.

12. The method as claimed in claim 1, wherein at least two digital/analog converters are provided which alternately guide the light beam, for the comparison of the first information item of the pixel with the second information item.

13. The method as claimed in claim 1, wherein the at least one light beam is parameterized in such a way that an imaging aberration is compensated for.

14. The method as claimed in claim 13, wherein the holding duration for each at least one light beam is set in such a way that each at least one light beam is projected into a region corresponding to the respectively associated pixel.

15. The method as claimed in claim 1, wherein the at least one light beam is deflected locally by means of a deflecting projection unit.

16. The method as claimed in claim 15, wherein the deflecting projection unit comprises a micromirror.

17. The method as claimed in claim 1, wherein the at least one light beam is made from at least one light source.

18. The method as claimed in claim 17, wherein the at least one light source comprises at least one laser.

19. The method as claimed in claim 1, wherein the light beam is made from a laser group consisting of a first laser group comprising a red laser, a blue laser and a green laser; and a second laser group comprising a red laser, a blue laser, and two green lasers.

20. The method as claimed in claim 1, wherein the at least one light beam is projected by means of a flying spot method.

21. The method as claimed in claim 1, wherein at least in part the holding duration of the at least one pixel is lengthened depending on a location of the projection of the respective pixel, wherein the holding duration can be set by means of a delay stage.

* * * * *

UNITED STATES PATENT AND TRADEMARK OFFICE
CERTIFICATE OF CORRECTION

PATENT NO. : 8,690,352 B2
APPLICATION NO. : 12/812059
DATED : April 8, 2014
INVENTOR(S) : Jens Richter and Jan Oliver Drumm It is certified that error appears in the above-identified patent and that said Letters Patent is hereby corrected as shown below:

In the Specification

Column 3, line 26, should read --and, e.g. in the case of the "flying spot" approach--;

Column 8, lines 42-50, the paragraph "While the invention......to be embraced" has been mistakenly added;

The paragraph --The approach described herein makes it possible, in particular, to efficiently reduce a spatial assignment error by means of a programmable delay stage or a delay stage regulated in analog fashion in a signal path between a digital/analog converter and an output stage or driver circuit-- should be inserted in place thereof;

Column 17, after line 61, the following paragraph should be inserted --While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced--;

Column 13, lines 20-25, the equations need to be separated as follows:

$$T_p = 18ns \qquad \frac{A_{Offset}}{A_{max}} = 0.01 \;;$$

Column 10, line 41, "U" needs to be changed to "Ui".

Signed and Sealed this
Twenty-eighth Day of April, 2015

Michelle K. Lee
*Director of the United States Patent and Trademark Office*